(12) United States Patent
Little et al.

(10) Patent No.: US 9,954,564 B2
(45) Date of Patent: Apr. 24, 2018

(54) ELECTROMAGNETIC COUPLERS WITH MULTI-BAND FILTERING

(71) Applicant: SKYWORKS SOLUTIONS, INC., Woburn, MA (US)

(72) Inventors: Christopher Robert Little, Hollis, NH (US); Nuttapong Srirattana, Billerica, MA (US); Dogan Gunes, North Andover, MA (US); David Scott Whitefield, Andover, MA (US)

(73) Assignee: SKYWORKS SOLUTIONS, INC., Woburn, MA (US)

( * ) Notice: Subject to any disclaimer, the term of this patent is extended or adjusted under 35 U.S.C. 154(b) by 0 days.

(21) Appl. No.: 15/423,677

(22) Filed: Feb. 3, 2017

(65) Prior Publication Data

US 2017/0230066 A1   Aug. 10, 2017

Related U.S. Application Data

(60) Provisional application No. 62/367,786, filed on Jul. 28, 2016, provisional application No. 62/292,041, filed on Feb. 5, 2016.

(51) Int. Cl.
*H04B 1/04* (2006.01)
*H04B 1/401* (2015.01)
(Continued)

(52) U.S. Cl.
CPC ........... *H04B 1/0458* (2013.01); *H04B 1/006* (2013.01); *H04B 1/401* (2013.01); *H04B 17/101* (2015.01);
(Continued)

(58) Field of Classification Search
CPC .... H04B 1/0458; H04B 1/401; H04B 17/318; H04B 1/006; H01B 1/0475; H03H 7/38;
(Continued)

(56) References Cited

U.S. PATENT DOCUMENTS 3,611,199 A   10/1971   Safran
3,868,594 A   2/1975   Cornwell et al.
(Continued)

FOREIGN PATENT DOCUMENTS

EP   2503701 A2   9/2012
JP   S62-159502 A   7/1987
(Continued)

OTHER PUBLICATIONS

International Search Report and Written Opinion from corresponding International Application No. PCT/US2017/016360 dated Apr. 25, 2017.

*Primary Examiner* — Thanh Le
(74) *Attorney, Agent, or Firm* — Lando & Anastasi, LLP

(57) ABSTRACT

A filtered electromagnetic coupler includes a main transmission line extending between an input port and an output port, and a coupled line section extending between a coupled port and an isolation port. The coupler is configured to couple signal power from the main transmission line to provide coupled signals at the coupled port, and a filter subsystem is connected to the coupled port to filter the coupled signals. The filter subsystem includes filters configured to pass or reject coupled signals by frequency, and the filter subsystem provides the filtered output signal to a measurement node.

23 Claims, 19 Drawing Sheets

(51) Int. Cl.
  *H04B 17/318* (2015.01)
  *H04B 1/00* (2006.01)
  *H04W 52/24* (2009.01)
  *H04B 17/10* (2015.01)

(52) U.S. Cl.
  CPC ........ *H04B 17/318* (2015.01); *H04W 52/245* (2013.01); *H04B 17/102* (2015.01); *H04B 17/103* (2015.01)

(58) Field of Classification Search
  CPC ... H03H 7/468; H01P 1/15; H01P 5/12; H01P 5/18; H01P 5/184
  See application file for complete search history.

(56) References Cited

U.S. PATENT DOCUMENTS

| | | |
|---|---|---|
| 4,460,875 A | 7/1984 | Harman |
| 4,677,399 A | 6/1987 | Le Dain et al. |
| 4,764,740 A | 8/1988 | Meyer |
| 5,038,112 A | 8/1991 | O'Neill |
| 5,222,246 A | 6/1993 | Wolkstein |
| 5,276,411 A | 1/1994 | Woodin, Jr. et al. |
| 5,363,071 A | 11/1994 | Schwent et al. |
| 5,487,184 A | 1/1996 | Nagode |
| 5,625,328 A | 4/1997 | Coleman, Jr. |
| 5,745,016 A | 4/1998 | Salminen |
| 5,767,753 A | 6/1998 | Ruelke |
| 6,020,795 A | 2/2000 | Kim |
| 6,078,299 A | 6/2000 | Scharfe, Jr. |
| 6,108,527 A | 8/2000 | Urban et al. |
| 6,329,880 B2 | 12/2001 | Akiya |
| 6,496,708 B1 | 12/2002 | Chan et al. |
| 6,559,740 B1 | 5/2003 | Schulz et al. |
| 6,771,141 B2 | 8/2004 | Iida et al. |
| 6,972,640 B2 | 12/2005 | Nagamori et al. |
| 7,042,309 B2 | 5/2006 | Podell |
| 7,236,069 B2 | 6/2007 | Puoskari |
| 7,305,223 B2 | 12/2007 | Liu et al. |
| 7,319,370 B2 | 1/2008 | Napijalo |
| 7,336,142 B2 | 2/2008 | Vogel |
| 7,493,093 B2 | 2/2009 | Boerman et al. |
| 7,538,635 B2 | 5/2009 | Fukuda et al. |
| 7,546,089 B2 | 6/2009 | Bellantoni |
| 7,966,140 B1 | 6/2011 | Gholson, III et al. |
| 8,175,554 B2 | 5/2012 | Camuffo et al. |
| 8,248,302 B2 | 8/2012 | Tsai et al. |
| 8,289,102 B2 | 10/2012 | Yamamoto et al. |
| 8,315,576 B2 | 11/2012 | Jones |
| 8,417,196 B2 | 4/2013 | Kitching et al. |
| 8,526,890 B1 | 9/2013 | Chien et al. |
| 8,606,198 B1 | 12/2013 | Wright |
| 8,761,026 B1* | 6/2014 | Berry .................... H01P 5/12 327/403 |
| 9,014,647 B2 | 4/2015 | Kitching et al. |
| 9,214,967 B2 | 12/2015 | Reisner et al. |
| 9,356,330 B1 | 5/2016 | Donoghue et al. |
| 9,634,371 B2 | 4/2017 | Swarup et al. |
| 2002/0097100 A1 | 7/2002 | Woods et al. |
| 2002/0113666 A1 | 8/2002 | Yamazaki et al. |
| 2002/0139975 A1 | 10/2002 | Lewis et al. |
| 2003/0214365 A1 | 11/2003 | Adar et al. |
| 2004/0127178 A1 | 7/2004 | Kuffner |
| 2004/0201526 A1 | 10/2004 | Knowles et al. |
| 2005/0017821 A1 | 1/2005 | Sawicki |
| 2005/0040912 A1 | 2/2005 | Pelz |
| 2005/0146394 A1 | 7/2005 | Podell |
| 2005/0170794 A1 | 8/2005 | Koukkari et al. |
| 2005/0239421 A1 | 10/2005 | Kim et al. |
| 2006/0232359 A1 | 10/2006 | Fukuda et al. |
| 2007/0082642 A1* | 4/2007 | Hattori .................... H04B 1/006 455/286 |
| 2007/0159268 A1 | 7/2007 | Podell |
| 2008/0036554 A1 | 2/2008 | Krausse et al. |
| 2008/0055187 A1* | 3/2008 | Tamura ..................... H01P 1/15 343/876 |
| 2008/0056638 A1 | 3/2008 | Glebov et al. |
| 2008/0070519 A1 | 3/2008 | Okabe |
| 2008/0112466 A1 | 5/2008 | Sasaki |
| 2009/0134953 A1 | 5/2009 | Hunt et al. |
| 2009/0195335 A1 | 8/2009 | Wahl et al. |
| 2009/0278624 A1 | 11/2009 | Tsai et al. |
| 2009/0280755 A1 | 11/2009 | Camuffo et al. |
| 2009/0322313 A1 | 12/2009 | Zhang et al. |
| 2011/0057746 A1 | 3/2011 | Yamamoto et al. |
| 2011/0063044 A1 | 3/2011 | Jones |
| 2011/0148548 A1 | 6/2011 | Uhm et al. |
| 2011/0199166 A1 | 8/2011 | Carrillo-Ramirez |
| 2011/0254637 A1* | 10/2011 | Manssen ............... H04B 1/0475 333/2 |
| 2011/0279192 A1 | 11/2011 | Nash et al. |
| 2011/0298559 A1 | 12/2011 | Kitching et al. |
| 2012/0019332 A1 | 1/2012 | Hino et al. |
| 2012/0019335 A1 | 1/2012 | Hoang et al. |
| 2012/0062333 A1 | 3/2012 | Ezzeddine et al. |
| 2012/0071123 A1 | 3/2012 | Jones et al. |
| 2012/0243579 A1 | 9/2012 | Premakanthan et al. |
| 2013/0005284 A1 | 1/2013 | Dalipi |
| 2013/0113575 A1 | 5/2013 | Easter |
| 2013/0194054 A1 | 8/2013 | Presti |
| 2013/0207741 A1 | 8/2013 | Presti |
| 2013/0241668 A1 | 9/2013 | Tokuda et al. |
| 2013/0293316 A1 | 11/2013 | Kitching et al. |
| 2013/0307635 A1 | 11/2013 | Kase et al. |
| 2014/0266499 A1 | 9/2014 | Noe |
| 2014/0368293 A1 | 12/2014 | Mukaiyama |
| 2015/0002239 A1 | 1/2015 | Tanaka |
| 2015/0043669 A1 | 2/2015 | Ella et al. |
| 2015/0091668 A1 | 4/2015 | Solomko et al. |
| 2015/0200437 A1 | 7/2015 | Solomko et al. |
| 2015/0249485 A1 | 9/2015 | Ouyang et al. |
| 2015/0326202 A1* | 11/2015 | Nicholls ................ H04B 1/006 327/553 |
| 2015/0349742 A1 | 12/2015 | Chen et al. |
| 2015/0372366 A1 | 12/2015 | Frye |
| 2016/0025928 A1 | 1/2016 | Onawa |
| 2016/0028147 A1 | 1/2016 | Srirattana et al. |
| 2016/0028420 A1 | 1/2016 | Srirattana et al. |
| 2016/0043458 A1 | 2/2016 | Sun et al. |
| 2016/0065167 A1 | 3/2016 | Granger-Jones et al. |
| 2016/0079649 A1 | 3/2016 | Ilkov et al. |
| 2016/0079650 A1 | 3/2016 | Solomko et al. |
| 2016/0172737 A1 | 6/2016 | Srirattana et al. |
| 2016/0172738 A1 | 6/2016 | Srirattana et al. |
| 2016/0172739 A1 | 6/2016 | Srirattana et al. |
| 2016/0172740 A1 | 6/2016 | Srirattana et al. |
| 2016/0268994 A1 | 9/2016 | Granger-Jones et al. |
| 2017/0033428 A1 | 2/2017 | Ootsuka et al. |
| 2017/0063425 A1 | 3/2017 | Khlat et al. |

FOREIGN PATENT DOCUMENTS

| | | |
|---|---|---|
| JP | 2000-077915 A | 3/2000 |
| JP | 2001127664 A | 5/2001 |
| JP | 2013126067 A | 6/2013 |
| KR | 20040037465 A | 5/2004 |
| KR | 20110118289 A | 10/2011 |
| KR | 20120007790 A | 1/2012 |
| WO | 2005018451 A1 | 3/2005 |
| WO | 2015020927 A2 | 2/2015 |
| WO | 2015134979 A1 | 9/2015 |

* cited by examiner

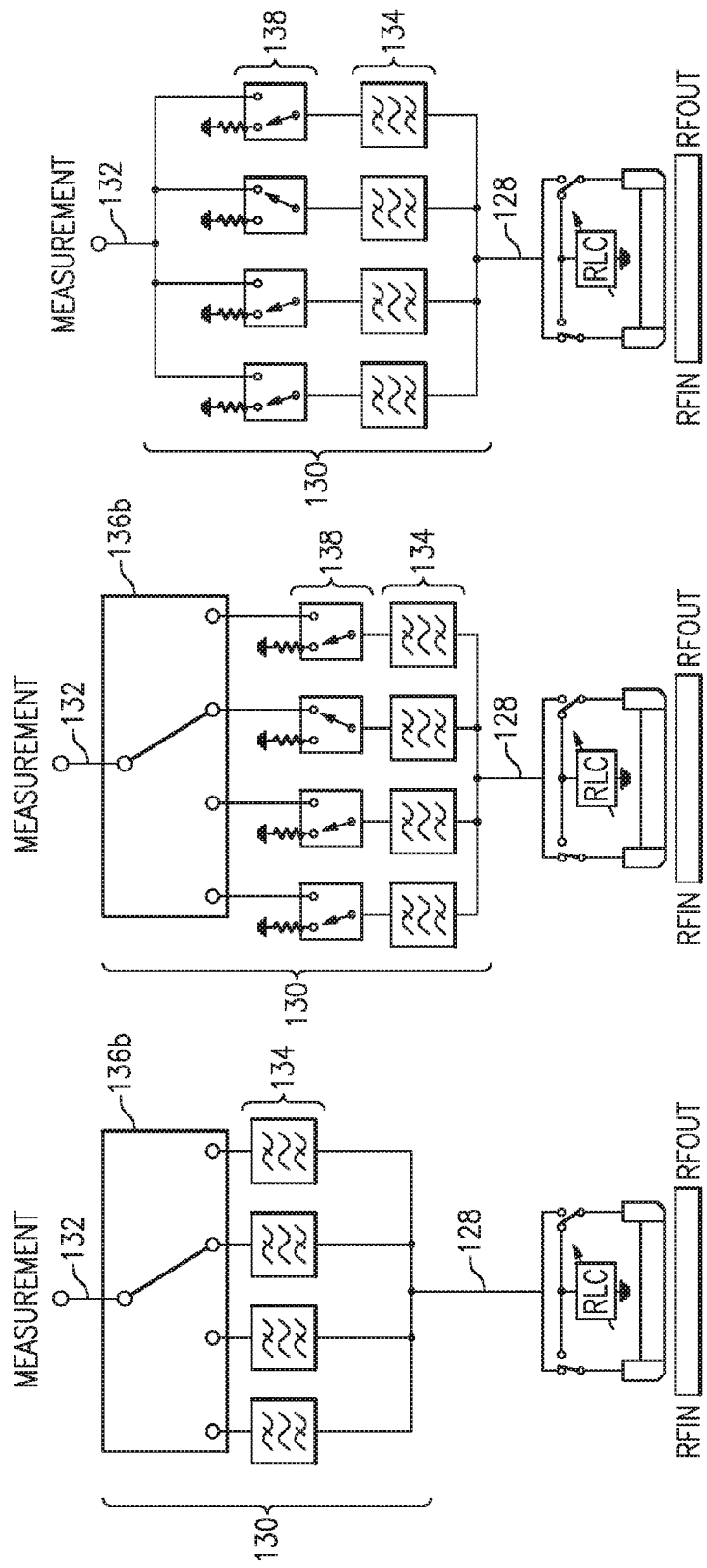

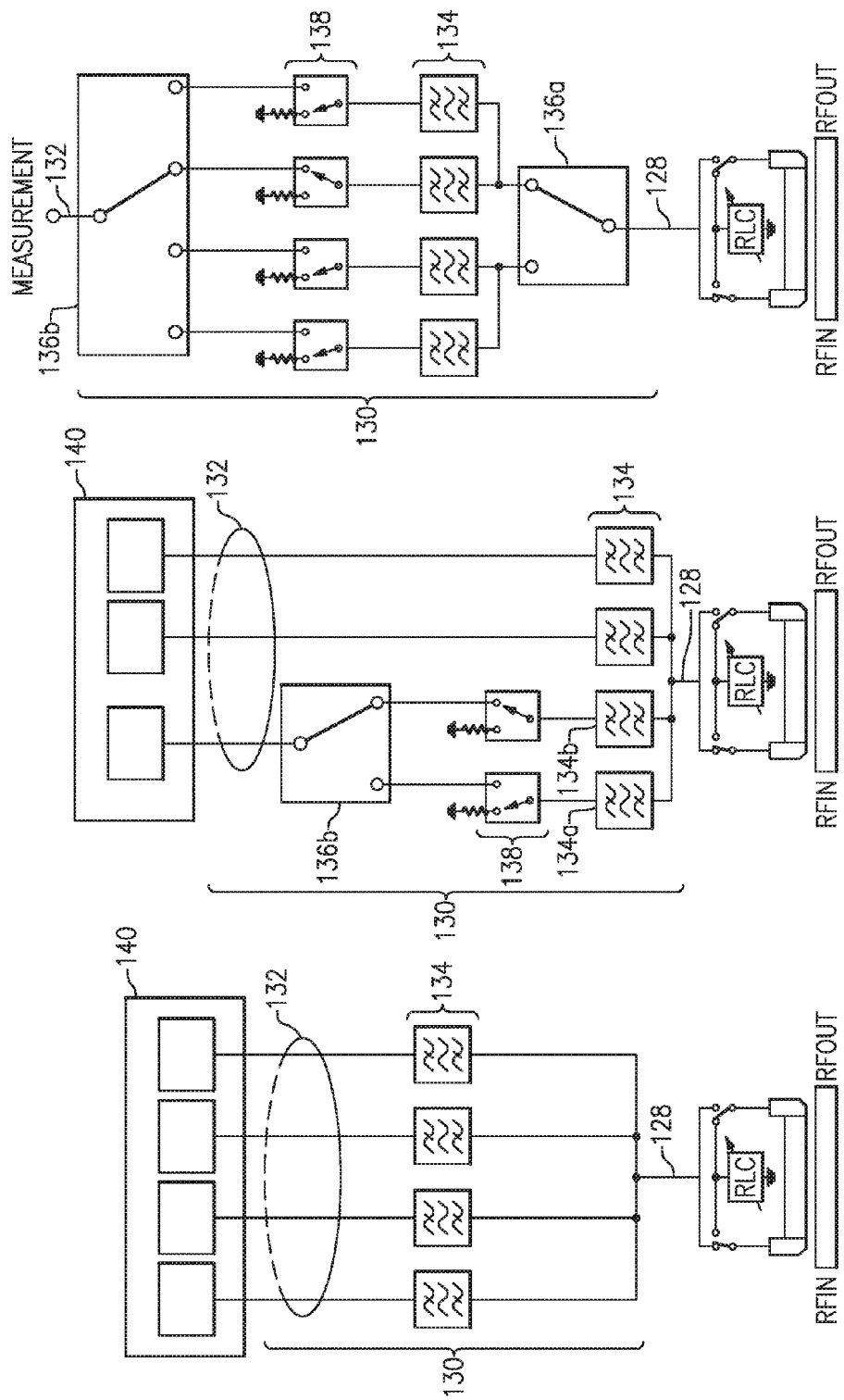

ELECTROMAGNETIC COUPLERS WITH MULTI-BAND FILTERING

CROSS REFERENCE TO RELATED APPLICATIONS

This application claims the benefit of priority under 35 U.S.C. § 119(e) and PCT Article 8 to U.S. Provisional Patent Application No. 62/292,041 filed on Feb. 5, 2016, and to U.S. Provisional Patent Application No. 62/367,786 filed on Jul. 28, 2016, each of which is incorporated herein by reference in its entirety for all purposes.

BACKGROUND

Radio frequency (RF) sources, such as RF amplifiers, provide RF signals. When an RF signal generated by an RF source is provided to a load, such as to an antenna, a portion of the RF signal can be reflected back from the load. An electromagnetic (EM) coupler can be included in a signal path between the RF source and the load to provide an indication of forward RF power of the RF signal traveling from the RF source to the load and/or an indication of reverse RF power reflected back from the load. EM couplers include, for example, directional couplers, bi-directional couplers, multi-band couplers (e.g., dual band couplers), and the like.

An EM coupler typically has a power input port, a power output port, a coupled port, and an isolation port. When a termination impedance is presented to the isolation port, an indication of forward RF power traveling from the power input port to the power output port is provided at the coupled port. When a termination impedance is presented to the coupled port, an indication of reverse RF power traveling from the power output port to the power input port is provided at the isolation port. The termination impedance is typically implemented by a 50 Ohm shunt resistor in a variety of conventional EM couplers.

An EM coupler can provide forward or reverse coupled RF components of an RF signal entering the power input port or the power output port, respectively, which can be useful for, e.g., measuring the power of the RF signal. When the RF signal contains multiple frequency components, for instance from different bands or multiple frequencies within the same band, the coupled output of traditional EM couplers will include the multiple frequency components. This can cause power measurement equipment to indicate a higher power than is attributable to the frequencies of interest.

SUMMARY OF INVENTION

Aspects and embodiments relate to electronic systems and, in particular, to electromagnetic (EM) couplers, which include radio frequency (RF) couplers.

According to one aspect, a filtered electromagnetic coupler includes a main transmission line extending between an input port and an output port, a coupled line section extending between a coupled port and an isolation port and configured to couple signal power from the main transmission line to provide a plurality of coupled signals at the coupled port, and a filter subsystem connected to the coupled port and configured to receive and filter the plurality of coupled signals to provide at least one filtered output signal at a measurement node, the filter subsystem including a plurality of filters including a first filter configured to pass a first coupled signal of the plurality of coupled signals and to reject a second coupled signal of the plurality of coupled signals, and a second filter configured to pass the second coupled signal and reject the first coupled signal, the first and second coupled signals having different frequencies.

In embodiments, the filtered electromagnetic coupler may include a mode switch operable to selectively provide the plurality of coupled signals as a forward signal representative of a signal traveling between the input port and the output port, or to selectively provide the plurality of coupled signals as a reverse signal representative of a signal traveling between the output port and the input port. In embodiments one or more of the plurality of filters may be selectively connected between the input port and the measurement node. In embodiments each of the plurality of filters may be one of a lowpass filter, a bandpass filter, a band-reject filter, or a highpass filter. In embodiments one or more of the plurality of filters may be an acoustic wave filter such as a surface acoustic wave (SAW) filter or a bulk acoustic wave (BAW) filter, or variations thereof such as a film bulk acoustic resonator (FBAR). In embodiments one or more of the plurality of filters may be an integrated passive device filter. In embodiments one or more of the plurality of filters may be adjustable.

Embodiments may include an adjustable termination impedance circuit connected to the isolation port. Embodiments may include a load selectively connected to at least one of the plurality of filters. The load may be an adjustable load.

In some embodiments the filtered electromagnetic coupler may comprise part of a coupler module.

According to another aspect, a system includes the filtered electromagnetic coupler described above, a transceiver configured to produce a transmit signal, and an antenna switch module configured to connect the transceiver to the filtered electromagnetic coupler and to direct the transmit signal to the input port of the filtered electromagnetic coupler.

The system may include a power amplifier module connected between the transceiver and the antenna switch module, the power amplifier module being configured to receive and amplify the transmit signal. The system may include an antenna connected to the output port of the filtered electromagnetic coupler, the antenna being configured to transmit the transmit signal and to receive a receive signal.

In embodiments, the filtered electromagnetic coupler may be configured to receive the receive signal at the output port and to provide the receive signal at the input port, and the antenna switch module may be configured to direct the receive signal to the transceiver.

In some embodiments the system may be a wireless device. The wireless device may include a processor, a computer readable medium, a controller, and a battery.

In another aspect, a module includes the filtered electromagnetic coupler described above, and an antenna switch module connected to one of the input port or the output port of the filtered electromagnetic coupler.

In embodiments, the module may include a power amplifier connected to the antenna switch module, and the antenna switch module may be connected between the power amplifier and the filtered electromagnetic coupler.

In embodiments, the module may comprise part of a wireless device that includes a transceiver configured to produce a transmit signal and to receive a receive signal. The wireless device may also include an antenna coupled to the filtered electromagnetic coupler and configured to transmit the transmit signal and to receive the receive signal. The wireless device may also include a battery, a computer readable medium, a controller, or a processor.

In another aspect, a method of providing an electromagnetic signal includes providing a plurality of coupled signals at a coupled port of an electromagnetic coupler, each coupled signal of the plurality of coupled signals having a respective frequency, directing the plurality of coupled signals to at least one of a plurality of filters, the plurality of filters including a first filter configured to pass a first coupled signal of the plurality of coupled signals and to reject a second coupled signal of the plurality of coupled signals, and a second filter configured to pass the second coupled signal and reject the first coupled signal, the first and second coupled signals having different frequencies, and providing the first coupled signal to a measurement node.

In embodiments, the method may include selectively providing the second coupled signal to the measurement node and the method may include detecting a power of the first coupled signal at the measurement node.

The method may include detecting the frequency of the first coupled signal. In embodiments, the method may also include adjusting an adjustable termination impedance connected to an isolation port of the electromagnetic coupler based in part upon the detected frequency of the first coupled signal. The method may include adjusting at least one of the plurality of filters based in part upon the detected frequency of the first coupled signal.

According to another aspect, a filtered electromagnetic coupler includes an input port, an output port, a coupled port, an isolation port, a measurement node, and a plurality of filters selectively connected between the coupled port and the measurement node, the plurality of filters including a first filter having a first filter characteristic that passes a first coupled signal having a first frequency and rejects a second coupled signal having a second frequency, and a second filter having a second filter characteristic that passes the second coupled signal and rejects the first coupled signal, to provide at least one filtered output signal at the measurement node.

According to embodiments, the measurement node may include a plurality of measurement node nodes and is configured such that the selective connectivity occurs by connecting a measurement device to one of the measurement node nodes.

In embodiments, each of the plurality of filters may be a lowpass filter, a bandpass filter, a band-reject filter, and a highpass filter. One or more of the filters may be an acoustic wave filter. One or more of the filters may be an integrated passive device filter. One or more of the filters may have an adjustable filter characteristic.

In embodiments, the coupler may include a load selectively connected to at least one of the plurality of filters. The load may be adjustable.

In embodiments, the coupler may include a termination impedance connected to the isolation port of the filtered electromagnetic coupler. The termination impedance may be adjustable.

The coupler may comprise part of a coupler module.

According to another aspect, a wireless device includes a filtered electromagnetic coupler as described above, an antenna connected to the output port of the filtered electromagnetic coupler; and a transceiver connected to the input port of the filtered electromagnetic coupler.

In embodiments, the transceiver may be configured to provide an input signal to the input port of the filtered electromagnetic coupler, and the first coupled signal and the second coupled signal may be derived from the input signal.

According to another aspect, a coupler module includes a filtered electromagnetic coupler according to any of the embodiments as described above and a control circuit coupled to at least one configurable component of the filtered electromagnetic coupler and coupled to a communication interface.

According to an embodiment, the control circuit is configured to receive at least one instruction via the communication interface and configured to select a selectable state of the configurable component. In embodiments, the configurable component may be a mode selection switch, an adjustable termination impedance, an adjustable filter, a selectable load, and a filter selection switch.

According to an embodiment, the control circuit is configured to select a coupler state and a filter state to cooperatively provide a desired filtered coupled output at the measurement node. Selecting a filter state may include selecting a selectable state of at least one of an adjustable filter, a selectable load, and a filter selection switch. Selecting a coupler state may include selecting a selectable state of at least one of a mode selection switch and an adjustable termination impedance.

According to another aspect, a wireless device includes the filtered electromagnetic coupler, communication interface, and control circuit as described above, and also includes an antenna connected to the output port of the filtered electromagnetic coupler and a transceiver connected to the input port of the filtered electromagnetic coupler.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIGS. 7A-7G are block diagrams of various embodiments of electromagnetic couplers with multi-band filtering, similar to FIG. 6A, in accord with aspects of the present invention;

DETAILED DESCRIPTION

Figure 1:
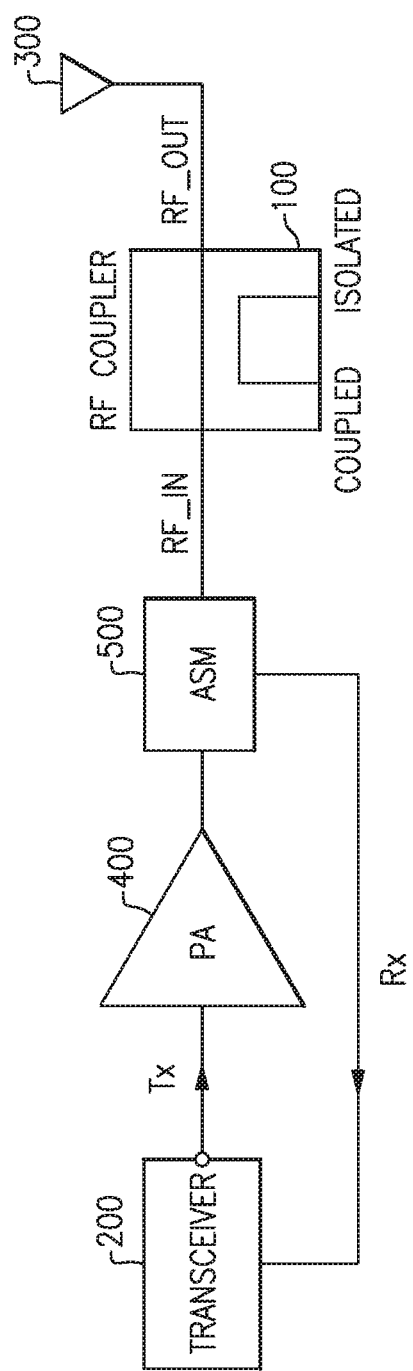
FIG. 1 is a block diagram of one example of an electronic system in which embodiments of the EM couplers according to aspects of the present invention may be used.

EM couplers are often used to direct a portion of a signal to a power measurement receiver for, e.g., controlling transmit power or determining antenna mismatch by measuring voltage standing wave ratio (VSWR). Bi-directional EM couplers have forward (FWD) and reverse (REV) coupled ports to couple signals received at either the input port (RFIN) or output port (RFOUT), respectively. When the forward coupled port is configured to provide the coupled signal (forward coupled mode), the reverse coupled port is an isolation port and is terminated with an impedance, and vice versa for the reverse coupled mode. The termination impedance is typically selected to provide a high directivity for the coupled port, and may be based in part on the frequencies involved.

Bi-directional EM couplers can provide accurate forward and reverse power measurements where the transmitter or transceiver system in which it is used operates in a single frequency band at a time. However, challenges arise in multi-band devices that transmit or receive signals in different bands simultaneously or where there are multiple simultaneous carrier frequencies within the same band. The simultaneous presence of two (or more) signals can cause interference problems when the coupler is used to attempt to measure the power of only one signal. In particular, the measurements of the forward or reverse power of one transmit signal can be contaminated by other signals, which may be present due to additional transmit signals in operation, e.g., from the same power amplifier or to the same antenna in a forward direction, or by a combination of received signals and/or reflected signals from an antenna in the reverse direction. Such problems may arise in numerous circumstances and applications. One specific application where a solution to this problem is directly applicable is that of LTE-Advanced Uplink Carrier Aggregation Radio Access Technology used in cellular handsets, for example.

Aspects and embodiments are directed to structures for EM couplers having capability for separation of coupled signals at multiple frequencies, as well as rapid, easy reconfigurability for optimization to different frequencies and/or combinations of frequencies in the forward or reverse direction. This capability may be highly desirable in numerous applications. For example, in communication transceivers it is desirable that all RF signals pass through a single EM coupler located close to the antenna. Aspects and embodiments of the EM couplers disclosed herein can meet this objective for multiple simultaneous operating frequencies of the transceiver. New mobile phone standards are emerging for receiving and/or transmitting data on multiple carrier frequencies simultaneously. In mobile phone applications, the ability to accurately monitor and control signal power can be critical. Accordingly, embodiments of the EM couplers disclosed herein may provide important functionality to systems implementing these new standards that is not available from conventional EM couplers.

Further, aspects and embodiments provide a coupler system that includes filtering to prevent unwanted signals from reaching the measurement receiver, and thereby allows for forward and reverse power measurements even when there are two or more simultaneous frequency bands in use. As discussed further below, certain embodiments use a mix of different filtering technologies in order to meet challenging performance specifications.

Certain embodiments provide a single, multi-filter EM coupler that can provide one or more coupled signal outputs separated by frequency or frequency band. As discussed in more detail below, certain aspects apply the use of frequency selective components, or filters, in conjunction with one or more EM couplers and switches to form switched coupled outputs with selectable frequency bands of interest. In certain examples, directivity of the couplers can be optimized using termination adjustment techniques, as discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

FIG. 1 is a schematic block diagram of one example of a system in which an EM coupler 100 is configured to extract a portion of power of an RF signal traveling between a transceiver 200 and an antenna 300. In this example, the EM coupler 100 is a bi-directional coupler. As illustrated, in the forward or transmit direction, a power amplifier module 400 receives an RF signal from the transceiver 200 and provides an amplified RF signal to the antenna 300 by way of an antenna switch module 500 and the EM coupler 100 operating in the forward mode. Similarly, in the receive direction, a received RF signal is provided from the antenna 300 to the transceiver 200 via the EM coupler 100 (operating in the reverse mode) and the antenna switch module 500. It will be understood by those skilled in the art that additional elements (not illustrated) can be included in the electronic system of FIG. 1 and/or a subcombination of the illustrated elements can be implemented.

The antenna switch module 500 can selectively electrically connect the antenna 300 to a selected transmit path or a selected receive path. The antenna switch module 500 can provide a number of switching functionalities. The antenna switch module 500 can include a multi throw switch configured to provide functionalities associated with, for example, switching between transmission and/or receiving modes, switching between transmission or receiving paths associated with different frequency bands, switching between transmission or receiving paths associated with different modes of operation, or any combination thereof.

The power amplifier module 400 amplifies an RF signal. The power amplifier module 400 can include any one or more suitable RF power amplifiers. For example, the power amplifier module 400 can include one or more of a single stage power amplifier, a multi-stage power amplifier, a power amplifier implemented by one or more bipolar transistors, or a power amplifier implemented by one or more field effect transistors. The power amplifier module 400 can be implemented on a GaAs die, CMOS die, SOI die, or a SiGe die, for example.

The antenna 300 can transmit the amplified RF signal, and receive RF signals. For example, when the electronic system illustrated in FIG. 1 is included in a cellular phone, the antenna 300 can transmit an RF signal from the cellular phone to a base station, and similarly receive RF signals from the base station.

Operating in the forward mode, the EM coupler 100 can extract a portion of the power of the amplified RF signal traveling between the power amplifier module 400 and the antenna 300. The EM coupler 100 can generate an indication of forward RF power traveling from the power amplifier module 400 to the antenna 300, for example. Operating in the reverse mode, the EM coupler 100 can generate an indication of reflected RF power traveling from the antenna 300 toward the power amplifier module 400, or can extract a portion of the power of an RF signal received by the antenna 300 from an external source. An indication of signal power can be provided to an RF power detector (not illustrated).

Figure 2A:
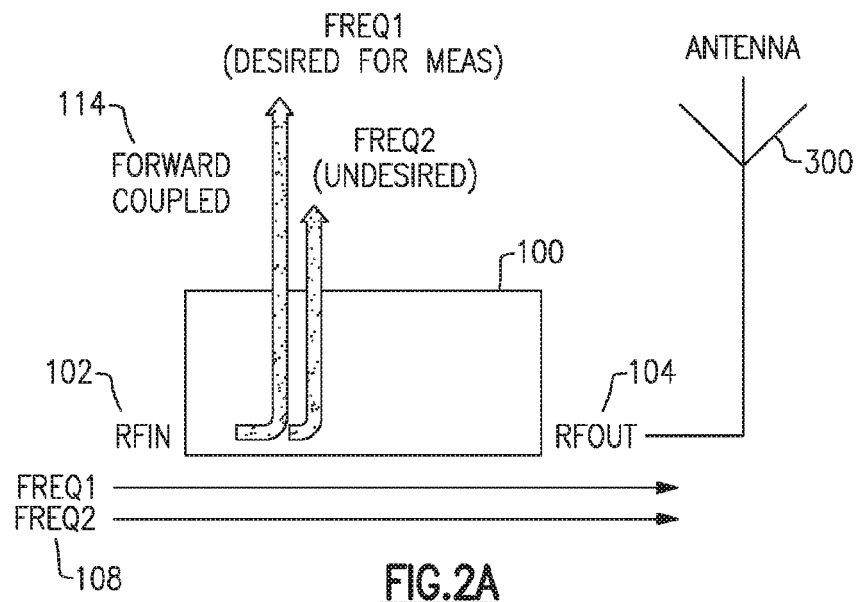
FIG. 2A is an illustration of an electromagnetic coupler in a forward mode multi-band scenario.

As discussed above, there is a growing need for receiving and/or transmitting data on multiple carrier frequencies simultaneously, however the desire for a single antenna and single EM coupler to simultaneously handle multiple frequencies presents challenges. For example, and with reference to FIG. 2A, there is shown a scenario in which a transmitted signal 108 is made up of two frequencies, freq1 and freq2, being transmitted from, for example, the power amplifier 400, to the antenna 300, via the EM coupler 100. The two frequencies, freq1 and freq2, may be in different frequency bands or may be two frequencies within the same band. In the forward operating mode, as shown, the coupled signal at the forward coupled port 114 is representative of the signal entering the EM coupler 100 at input port 102. In general the power of the coupled signal is a fraction of the input signal (e.g., transmitted signal 108) and will have components of both of the input frequencies. To control transmit power, a coupled signal is typically measured by a measurement receiver to provide feedback to the power amplifier 400 to either increase or decrease power. However, to control the transmit power of freq1 it is desirable to have a measurement of the power due solely to the freq1 component of the signal. The additional power in the coupled signal due to the freq2 component will cause the measurement receiver to measure, and indicate, a higher power than is attributable to the freq1 component alone.

Figure 2B:
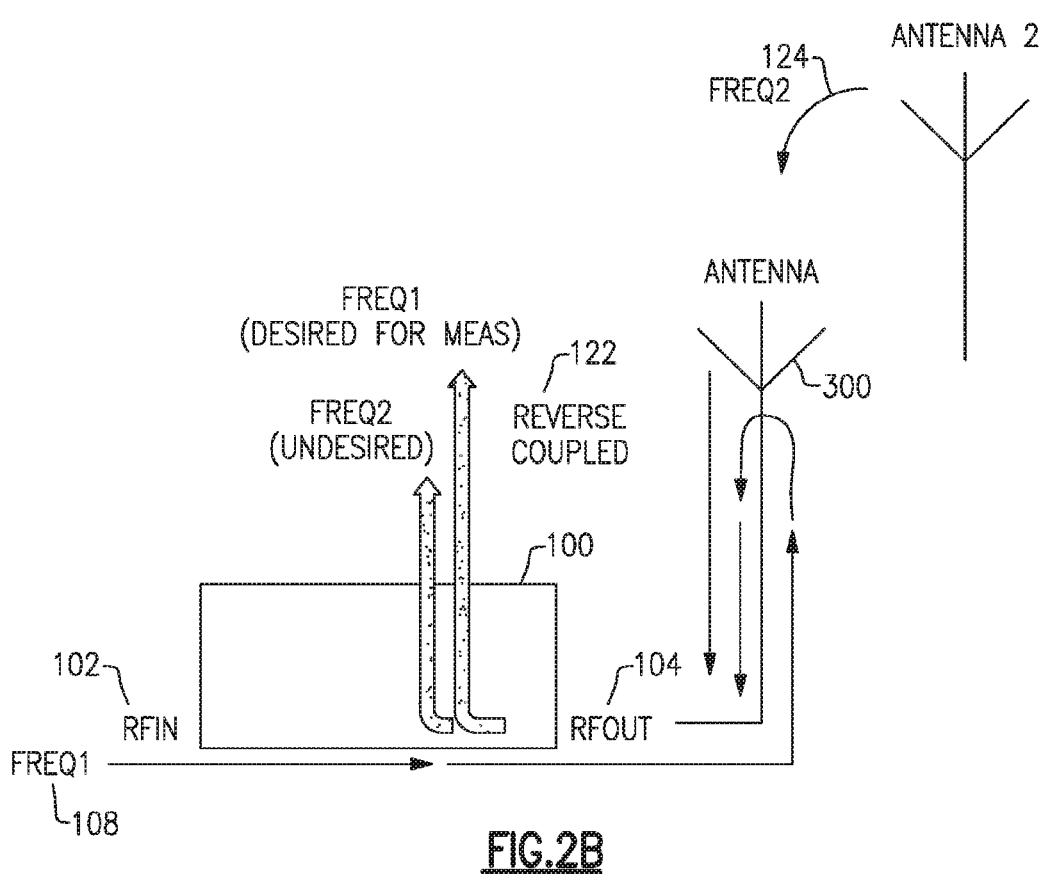
FIG. 2B is an illustration of an electromagnetic coupler in a reverse mode multi-band scenario.

Another scenario that challenges accurate power measurement is illustrated in FIG. 2B, wherein the EM coupler 100 is configured for the reverse operating mode and the coupled signal at the reverse coupled port 122 is representative of the signal coming from the antenna 300. The signal coming from the antenna 300 may contain a portion of a transmitted signal 108, at freq1, reflected from the antenna, and a received signal 124, at freq2, received from another transmitter. In this scenario, it may be desirable to measure the signal power of either the freq1 component, e.g., to determine VSWR between the power amplifier 400 and the antenna 300, or the freq2 component, e.g., to notify the other transmitter to increase or decrease power. However, if the coupled signal were to be presented directly to the measurement receiver, the power measurement would indicate the total power of both components combined and may not be useful for either purpose.

Referring in general to the examples above and the various embodiments described throughout, freq1 and freq2 may represent individual carrier frequencies, or may represent a range of frequencies, or one or more bands of frequencies. Ranges or bands of frequencies may even overlap in certain scenarios, while embodiments described herein may still be useful therefor. In some cases, particularly where individual carrier frequencies are of interest, each of freq1 and freq2 may represent a small range of frequencies around a carrier frequency. In other cases, freq1 and freq2 may represent entire bands of carrier frequencies, depending upon what is of interest. While two frequency components of interest have been discussed, it will be readily understood that three, four, or any number of frequencies, ranges, or bands are contemplated by embodiments disclosed herein and are readily supported thereby.

Figure 3:
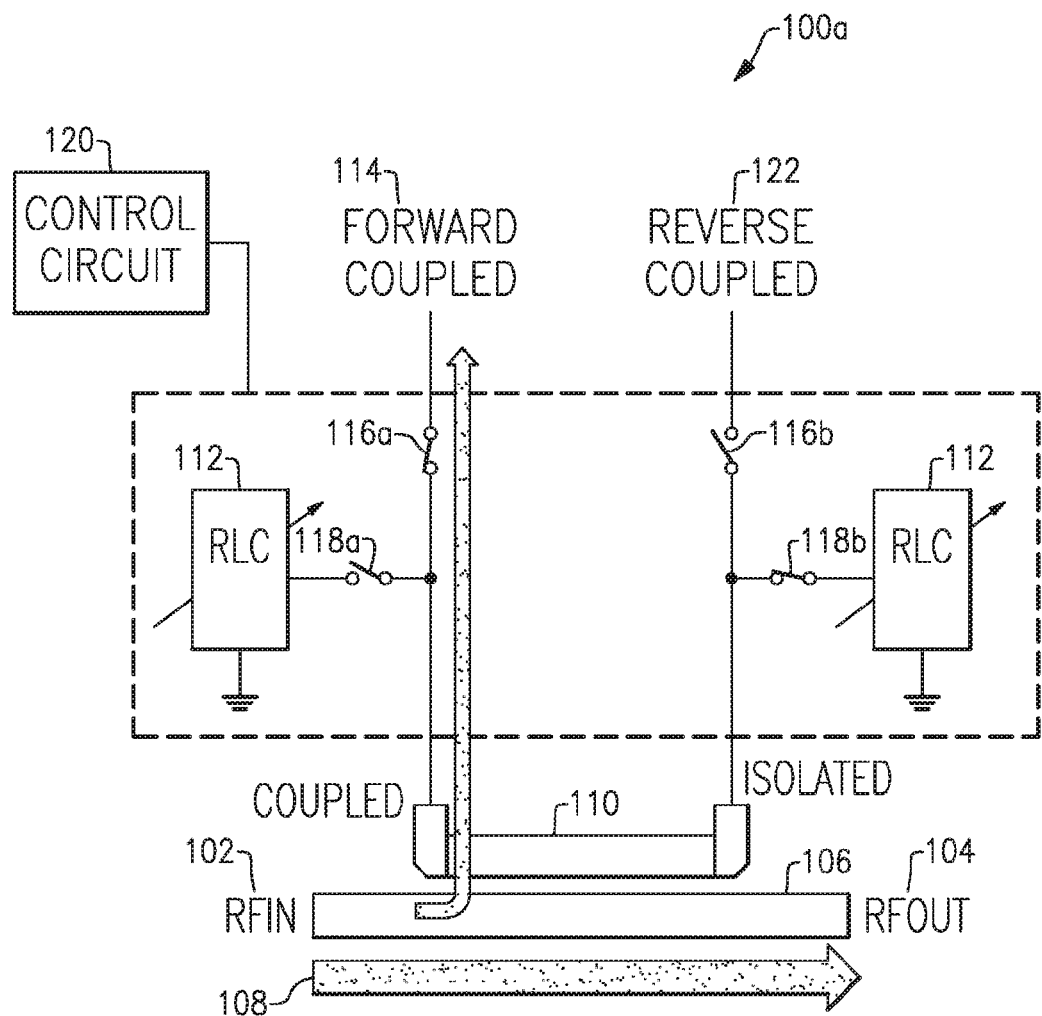
FIG. 3 is a block diagram of an electromagnetic coupler including adjustable termination impedances and directional switching in accord with aspects of the present invention.

Referring to FIG. 3, there is illustrated a circuit diagram of one example of an EM coupler 100a according to certain embodiments, which may be used in the system of FIG. 1, for example. The EM coupler 100a has an input port (RFIN) 102, an output port (RFOUT) 104, and a main transmission line 106 electrically connecting the input port 102 and the output port 104. In the illustrated example, the EM coupler 100a is a bi-directional coupler. When operating in the forward mode, the EM coupler 100a receives a transmitted signal 108, made up of one or more input frequencies, at the input port 102. When operating in the reverse mode, the input frequencies are alternatively received at the output port 104. As used herein, the term "input frequency" is intended to refer to an RF signal comprised of a single carrier frequency or having a certain, typically relatively narrow, bandwidth covering a range of frequencies.

The EM coupler 100a further includes a coupled line section 110 that is switchably connected to either a forward coupled port or a reverse coupled port, and a corresponding termination load at the respective isolation port. In the example illustrated in FIG. 3, the EM coupler 100a is configured for operation in the forward direction. Accordingly, the coupled line section 110 is connected to a forward coupled port 114 on one end via switch 116a being in the closed position, and to a termination load 112 on the other end via switch 118b being in the closed position. Thus, a coupler is formed by the main transmission line 106 and the coupled line section 110, having the input port 102, the output port 104, and the forward coupled port 114. The coupler can be reconfigured for reverse operation by opening switches 116a and 118b, and closing switches 116b and 118a to connect the coupled line section 110 to a reverse coupled port 122 on one end and termination load 112 on the other. The termination loads are adjustable loads controllable to present a selected impedance, and may include various resistors (R), inductors (L), and capacitors (C) arranged in a network or circuit (RLC) to selectively present one or more impedance values. In the EM coupler 100a shown in FIG. 3, the adjustable termination impedances 112 and the switches 116a, 116b, 118a, 118b are controlled by a control circuit 120.

Providing adjustable termination impedances allows the EM coupler 100a to be optimized for various operating conditions or frequency bands. A particular termination impedance or combination of termination impedances can be selected for any suitable application parameter(s) and/or any suitable indication of operating condition(s). More specifically, having a particular impedance for a particular power mode and/or frequency band can improve the directivity of the EM coupler 100a, which can aid in improving, for example, the accuracy of power measurements associated with the EM coupler 100a. In the example illustrated in FIG. 3, the termination loads 112 are shown as adjustable RLC networks integral to the EM coupler 100a, but they may be other forms of adjustable impedance or may be fixed loads, such as a fixed 50 Ohm load, and they may be implemented as separate components. Additionally, in embodiments there may be only one termination load, selectively switchable between multiple connection points, or there may be additional coupled line sections and additional termination loads.

Figure 4:
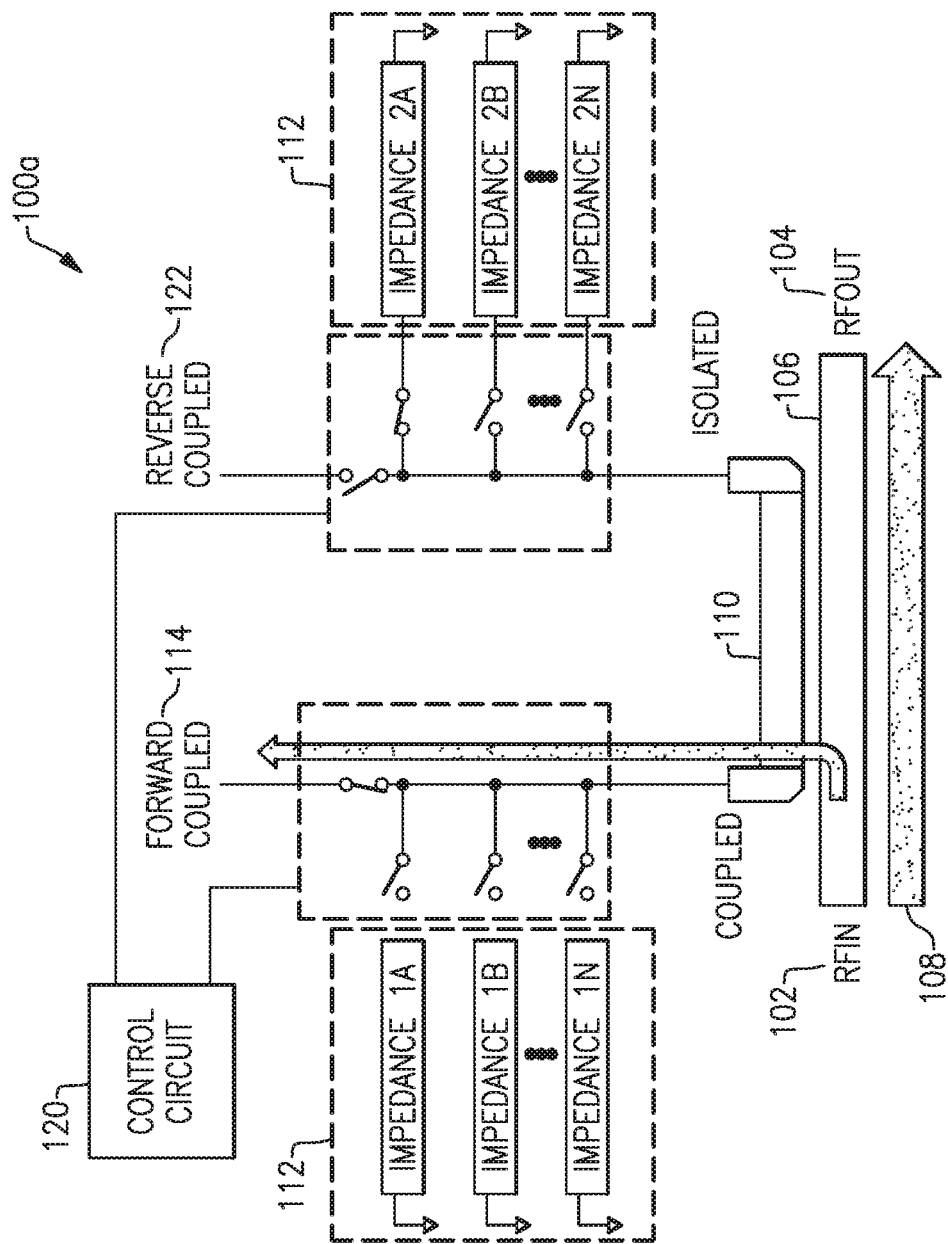
FIG. 4 is a block diagram of an alternate electromagnetic coupler of FIG. 3 in accord with aspects of the present invention.

FIG. 4 illustrates an example of the EM coupler 100a in which the adjustable termination impedances 112 are implemented as a specific embodiment of selective impedance circuits. The various switches shown are controlled by the control circuit 120 to connect any of multiple impedances to either end of the coupled line section 110. Various additional embodiments of adjustable impedance circuits suitable for use as a termination load 112 are disclosed in one or more of the related co-pending applications identified above.

Figure 5A:
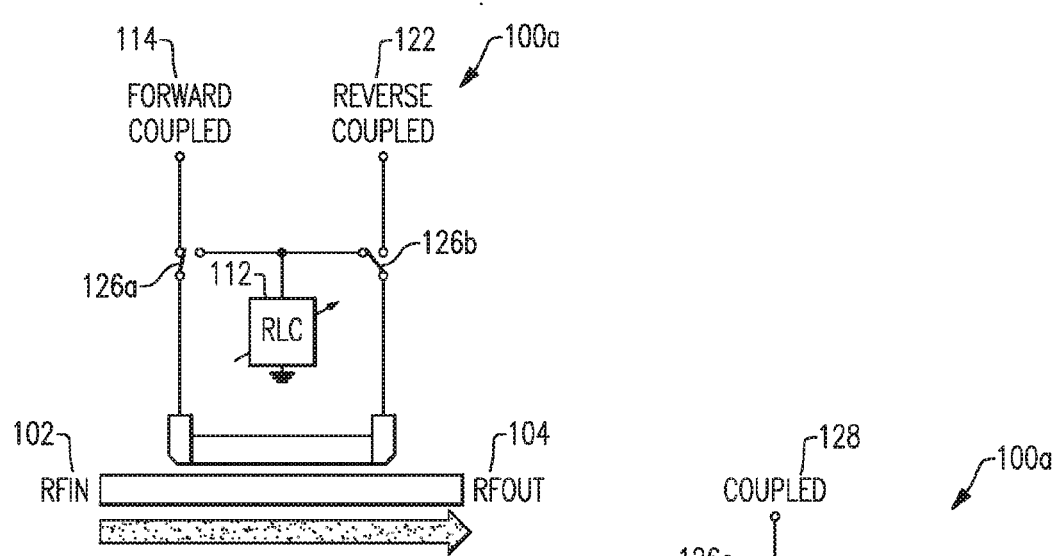
FIGS. 5A-5C are block diagrams of various electromagnetic couplers, similar to FIG. 3, including alternative directional switching arrangements in accord with aspects of the present invention.
Figure 5B:
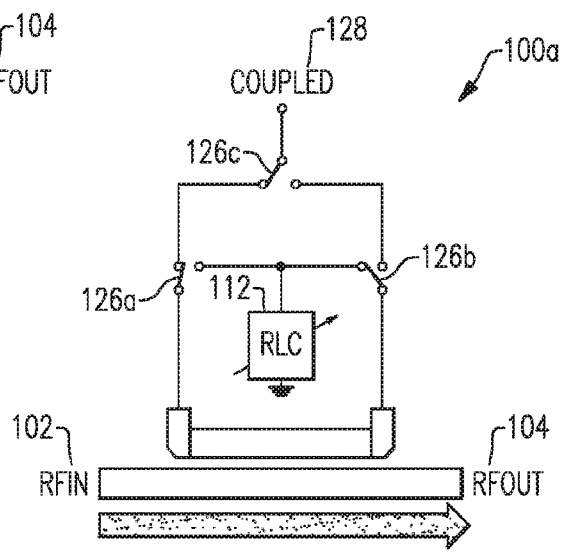
Figure 5C:
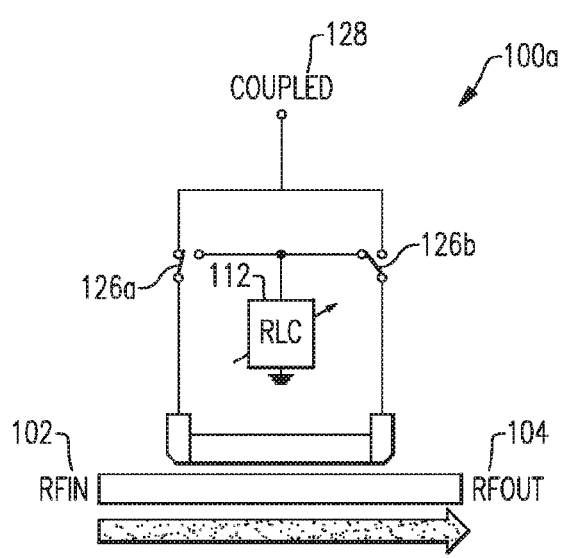

FIGS. 5A through 5C show various alternative arrangements of coupled ports, switches, and termination loads for the EM coupler 100a in accordance with various aspects and embodiments. It will be apparent to one of skill in the art that the arrangement shown in any of FIGS. 5A through 5C may be used in place of the EM coupler 100a of FIG. 3.

The arrangement shown in FIG. 5A reduces the number of switches from that of FIG. 3 and utilizes a single adjustable termination impedance 112 to be selectively coupled in a forward operating mode (as shown) or a reverse operating mode. The switches 126a, 126b act as mode selection switches. If the setting of mode selection switches 126a and 126b are each reversed, the EM coupler 100a will be switched to reverse operating mode. The control circuit 120 is not shown, but may still be operable to control the mode selection switches 126a, 126b, or the impedance value of the adjustable termination impedance 112, or both.

FIG. 5B shows a further reduction in the circuit complexity of the EM coupler 100a in accordance with various aspects and embodiments. The separate forward coupled port 114 and reverse coupled port 122 of the previous figures are reduced to a single coupled port 128 selectively connected to provide the forward or reverse coupled output by the mode selection switch 126c. The EM coupler 100a may be further simplified, as shown in FIG. 5C, by removing the mode selection switch 126c because mode selection switches 126a and 126b themselves may effectively selectively connect the coupled port 128 to provide the forward or reverse coupled output, depending upon the mode of operation desired. In general, any switch or set of switches that affects the operating mode, forward or reverse, may be referred to as a mode selection switch 126.

While numerous arrangements of the EM coupler 100a have been shown, there are numerous additional arrangements that can allow the EM coupler 100a to selectively operate in a forward or reverse mode, and with a particular termination impedance selected for any suitable operating condition. Further aspects discussed below may include components and features to be combined with the EM coupler 100a. For simplicity, additional components and features will be discussed and shown as being combined with the simplified EM coupler 100a shown in FIG. 5C, but it will be understood that the additional components and features may be used with any suitable arrangement for the EM coupler 100a. In particular, and in accordance with certain embodiments, the performance of an EM coupler as described above may be further enhanced through the use of frequency selective components associated with the coupled path.

Figure 6A:
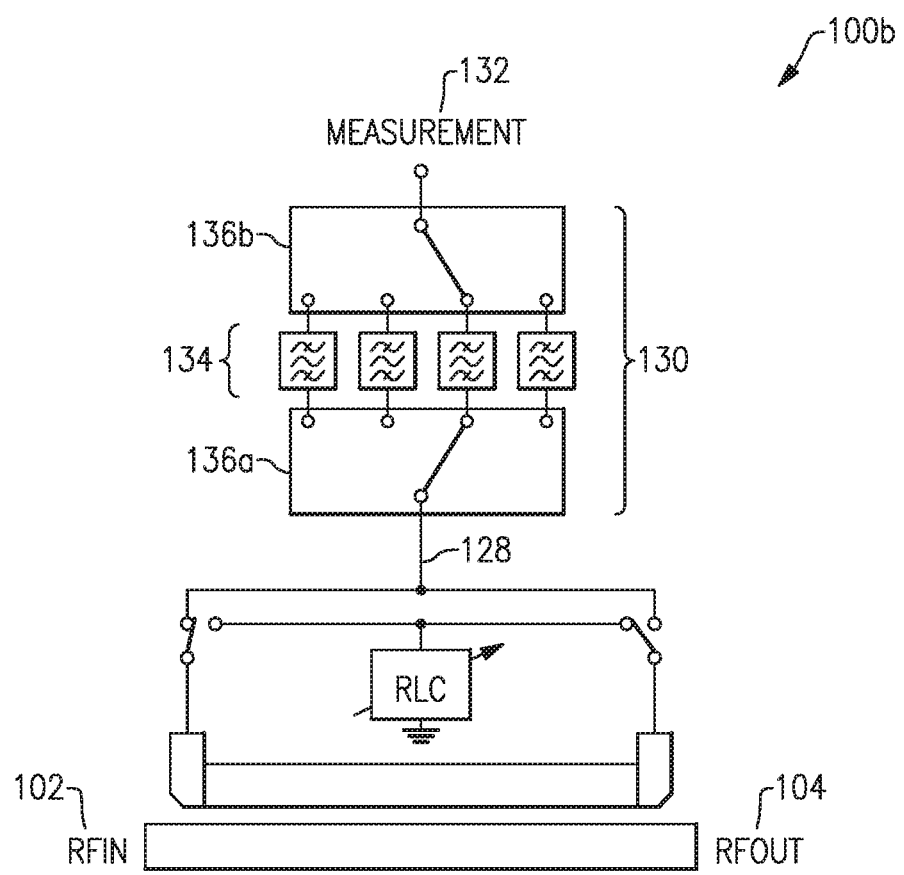
FIG. 6A is a block diagram of an electromagnetic coupler with multi-band filtering in accord with aspects of the present invention.

Referring to FIG. 6A, there is illustrated one example of an EM coupler 100b that includes a filtering subsystem 130 in accord with aspects and embodiments. The filtering subsystem 130 is connected to the coupled port 128 to filter out unwanted signal components, or stated in the alternative, to selectively allow desired signal components through, to present a filtered output signal at a measurement node 132. The filtering subsystem 130 includes multiple frequency selective filters 134, which may be active or passive filters and, in various embodiments, each may be a low-pass, a band-pass, a band-reject, or a high-pass filter.

In the example shown in FIG. 6A, each of the filters 134 is selectable by a pair of filter selection switches 136a, 136b. The filter input selection switch 136a selectively connects the coupled port 128 to one of the filters 134. The selected one of the filters 134 filters a coupled signal from the coupled port 128 and the filter output selection switch 136b connects the output to the measurement node 132. In other embodiments the selection switch 136b can be omitted. Thus, for example, the outputs of each of the filters 134 can be connected directly to the measurement node 132 without the intervening switch 136b. In certain embodiments, each of the filters 134 may be implemented as an acoustic wave filter, such as a surface acoustic wave (SAW) filter or a bulk acoustic wave (BAW) filter, or variations thereof such as a film bulk acoustic resonator (FBAR); an Integrated Passive Device (IPD) filter; one or more surface mounted elements; or any other suitable type of EM filter construction; and the filtering subsystem 130 may have any combination of types of filters as the filters 134. As discussed above, the EM coupler 100b may be controlled to be in a forward coupled mode (as shown) or a reverse coupled mode. The filtering subsystem 130 shown includes four filters 134, but various embodiments may have fewer or more filters 134 depending upon the needs of the operational parameters or the application. Similarly, the filter selection switches 136a, 136b are shown as four-position switches, but other embodiments may have fewer or more positions.

Figure 6B:
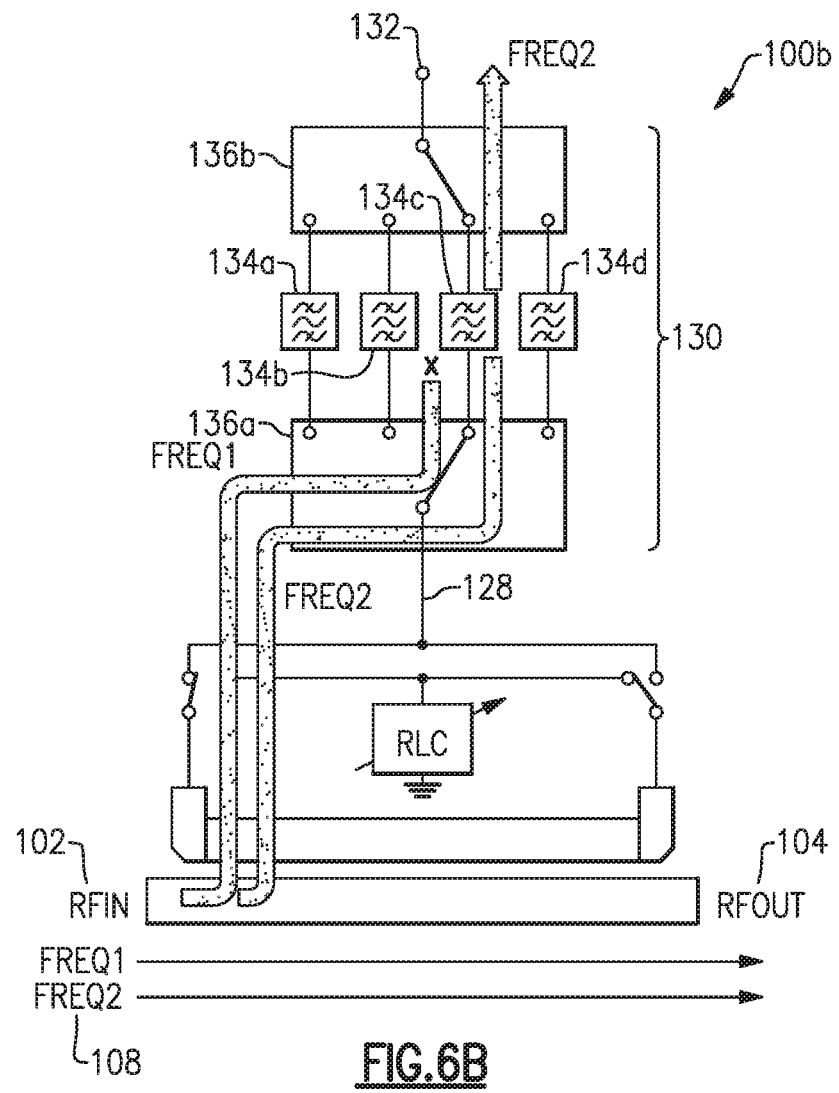
FIG. 6B is an illustration of the electromagnetic coupler of FIG. 6A in a forward mode multi-band scenario.

Referring to FIG. 6B, a multi-frequency scenario is illustrated wherein a transmitted signal 108 includes two carrier frequencies, freq1 and freq2, and it is desired to measure the power of only the freq2 component of a coupled signal at the measurement node 132. To achieve this, the filter selection switches 136a, 136b are positioned to select filter 134c as shown. Specifically, the filter selection switches are positioned to electrically connect the coupled port 128 to the measurement node 132 through the filter 134c. In this example, filter 134c is a frequency selective filter that will allow a freq2 component to pass and will prevent, or reject, a freq1 component from passing. Accordingly, only the freq2 component of the coupled signal will be present at the measurement node 132. A measurement device attached to the measurement node 132 will therefore be able to make measurements representative of the freq2 component of the transmitted signal 108 with little or no interference by the freq1 component.

As discussed above, a frequency component may represent a range of frequencies. As in the above example with respect to FIG. 6B, where freq2 represents a transmitted carrier frequency, the freq2 component may comprise a narrow range of frequencies as is typical of a modulated signal, as will be readily understood by those of skill in the art. The filter 134c accordingly may allow only the frequencies within the narrow range to pass. In other cases, the freq2 component may be sufficiently separate from freq1, in the frequency domain, that the filter 134c may allow a full band to pass, or may reject only lower frequencies than a certain band of interest, or may reject only higher frequencies, while still being suitable to separate the freq2 component of the transmitted signal 108 from the freq1 component.

Additionally, in various embodiments, each of the filters 134 may individually be bandpass, band-reject, lowpass, or highpass filters. In certain examples, any one or more of the filters 134 can be adjustable to allow the passed frequency range to be adjusted, for example, to accommodate changing operational parameters or applications. Additionally, as shown and discussed above, in certain embodiments the filters 134 can be positioned between the mode select switches 126 and the measurement node 132, whereas in other embodiments, the filters 134 can be positioned between the coupled line section 110 and the mode select switches 126, or may be connected in alternative arrangements.

Referring again to FIG. 6A, in the illustrated example the switch 136a is a filter selection switch that controls the input side of the filtering subsystem 130 and the switch 136b is a filter selection switch that controls the output side of the filtering subsystem 130. However, a variety of alternate embodiments of the input and output of the filtering subsystem 130 can be implemented, as will be appreciated by those of skill in the art given the benefit of this disclosure. For example, with reference to FIGS. 7A to 7G, multiple variations in the input and output of the filtering subsystem 130 are shown. For reference, in the examples of FIGS. 6A to 7G, the coupled port 128 is an input port to the filtering subsystem 130, and the measurement node 132 is an output port of the filtering subsystem 130.

For example, FIG. 7A shows an embodiment where the input port to the filtering subsystem 130 is connected as a common bus to the various filters 134. In this case, selection of which filtered output to be received at the measurement node 132 is made by the filter selection switch 136b alone. As discussed above, in other examples, the opposite arrangement to that shown in FIG. 7A can be implemented. That is, the outputs of each of the filters 134 can be connected to a common bus that is connected to the measurement node 132 (i.e., the selection switch 136b is omitted), and selection of which filtered output is to be received at the measurement node 132 is made by the filter selection switch 136a alone.

A consideration in the example of FIG. 7A is whether the filters 134 not selected by filter selection switch 136b will adequately absorb the coupled signal they receive. If unselected filters cause portions of the coupled signal to be reflected back onto the common bus, and to the coupled port 128, they could potentially interfere with other operations of the EM coupler or the system. In such a case, it may be desirable to add loading to the unselected filters 134, as in the example embodiment of FIG. 7B. Selectable loads 138 are shown connected to the output of each of filters 134 to provide a load, e.g., 50 Ohms, that may absorb the signal energy allowed to pass by the filter 134 to which each of the selectable loads 138 is attached. The selectable loads 138 are each shown as a single-pole double-throw switch that selects whether the filter 134 output is sent to the load or sent to the filter selection switch 136b, though other arrangements exist. In this manner, unselected filters 134 may be prevented from sending, e.g., reflecting, signal energy back toward the coupled port 128. It will be understood by one of skill in the art, with the benefit of this disclosure, that any one of the selectable loads 138 may be removed from an embodiment if the associated one of the filters 134 is sufficient to absorb or otherwise prevent signal energy from returning toward the coupled port 128, or if the particular needs of the application are such that reflected or returned signal energy is not problematic. In other embodiments the selectable loads could also include tunable or adjustable loads, similar to the termination loads 112.

Turning to FIG. 7C, in another embodiment, the output of the filtering subsystem 130 can be a common bus. In this example, each of the filters 134 is connected to a selectable load 138, and the switches of the selectable loads 138 each effectively disconnect those of the filters 134 that are not being actively used, i.e., that are not selected, thus allowing the possibility that, in some embodiments, the selectable loads 138 may additionally perform the function of the filter selection switch 136b of the previously described embodiments.

With reference to FIG. 7D, another embodiment is shown that may effectively terminate coupled signal energy filtered by filters 134. As shown the output of each filter 134 may be connected to the input of a measurement device 140. The measurement device 140 may be one device providing multiple terminated inputs, or may be multiple measurement devices 140, each providing a terminated input. The measurement device(s) 140 may be operable to measure the power of the filtered coupled signal each receives, which is indicative of the power of one or more components, as selected by the filtering subsystem 130, of the transmitted signal 108 and/or the received signal 124. In this case, the measurement node 132 as shown is made up of four measurement node nodes, each of which is associated with one of the filters 134, but alternate arrangements are contemplated and more or fewer filters 134 and/or measurement node 132 nodes may be accommodated. One such example is shown in FIG. 7E.

With reference to FIG. 7E, an additional combination of input bus, filter select switches, selectable loads, and measurement node nodes is shown. In this example, a measurement device 140 provides three terminated inputs to make measurements of received filtered coupled signals, and the filtering subsystem 130 has four filters 134, thus it is necessary to accommodate the four possible filtered coupled signals to the measurement device 140 with only three inputs. One such solution, shown in FIG. 7E, includes a two-position filter selection switch 136b to select between two of the filters 134a, 134b to be connected to one of the measurement device 140 inputs. In this arrangement, one of the two filters 134a, 134b will be unconnected, i.e., unselected by filter selection switch 136b, at any given time. If the unselected one of the filters 134a, 134b is not capable of absorbing the coupled signal energy it receives from the coupled port 128, and therefore might otherwise reflect energy back toward the coupled port 128, two selectable loads 138 are included in this arrangement to absorb filtered coupled signal energy from either one of the filters 134a, 134b when the filter is unselected, if necessary. In other embodiments it may not be necessary to provide the two selectable loads 138 in FIG. 7E, or only one selectable load 138 may be required, as similarly discussed depending upon the needs of the system or the capability of each of the filters 134.

FIG. 7F shows yet another example embodiment of an arrangement of components to make up the filtering subsystem 130. The four filters 134 have inputs connected to the coupled port 128 via a two-position filter selection switch 136a that selects one of two semi-common buses, each of which connects to the inputs of two of the four filters 134. The outputs of the filters 134 are (optionally) loaded by selectable loads 138, and a four-position filter selection switch 136b selects one of the four potential filtered coupled signals to provide to the measurement node 132. As before, there may be more or fewer selectable loads 138, more, fewer, or different filter selection switches 136, and more or fewer filters 134 in various embodiments.

Figure 7G:
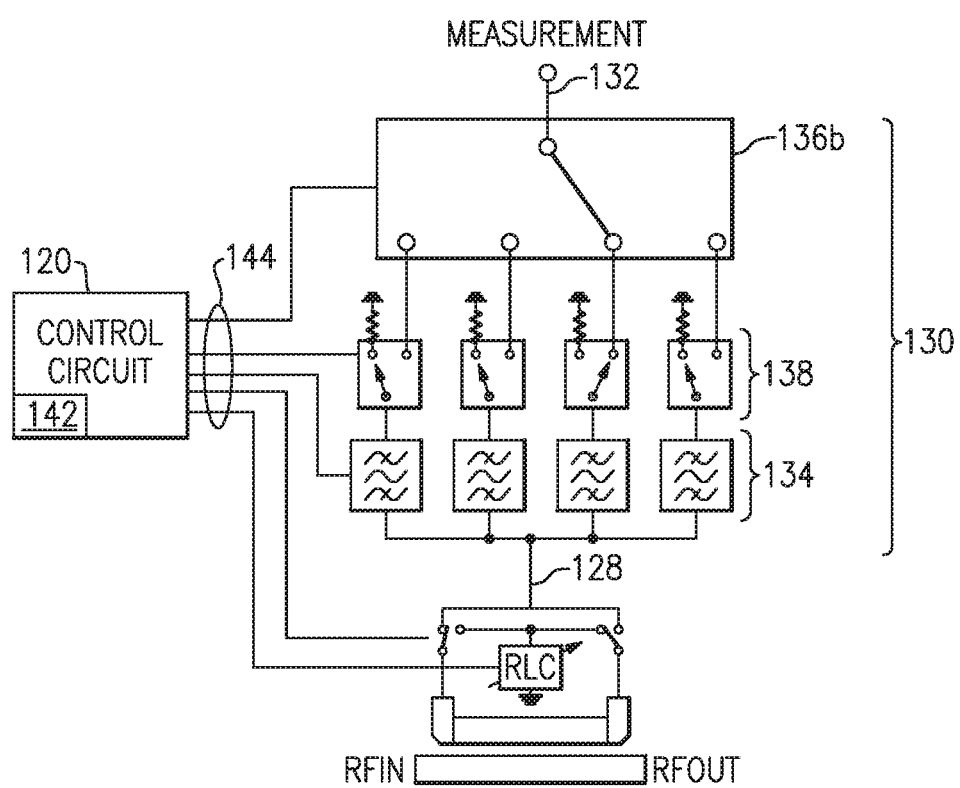

In certain embodiments multiple outputs from individual filters 134 may be combined by one or more, e.g., diplexers, duplexers, triplexers, quadplexers, and the like, to provide an output signal that includes one or more filtered signals. For example, with reference to FIG. 7C, the measurement node 132 may provide filtered signals from multiple of the filters 134 whenever more than one selectable load 138 is positioned to couple their respective filters 134 to the measurement node 132. As a further example, the outputs of the filters 134, or the selectable loads 138, as shown e.g., in FIG. 7C, may be combined together by a duplexer, triplexer, quadplexer, or the like, to provide the combined filtered signals to a measurement node 132 such that the individual outputs of the filters 134 or the selectable loads 138 do not interfere with each other, e.g., to prevent the output signal of one of the filters 134 or selectable loads 138 from entering the output of another of the filters 134 or selectable loads 138. With reference to FIGS. 7D and 7E, for example, measurement device 140 could instead be a duplexer, triplexer, quadplexer, or the like, having a further output that provides a combination of selected filtered output signals from among the various filters 134. In various embodiments the output signals from the various filters 134 may be coupled to varying other components or combined in different ways FIG. 7G illustrates that embodiments of the electromagnetic couplers disclosed herein may include a control circuit 120 that may control any of the selectable or switchable states of the configurable components discussed herein. For example, and with reference to FIG. 7G but applicable to any embodiment, the control circuit 120 may be configured to control any one or more of the adjustable termination impedances 112, the mode selection switches 126, the filters 134, the filter selection switches 136, and the selectable loads 138, if provided, via a control interface 144 of the configurable components. The control circuit 120 may have a communication interface 142 for communicating with an external device or component, e.g., a master device, to receive instructions for the control circuit 120 to make individual changes to the various adjustable or switched components. Alternately or in addition, instructions to the control circuit 120 may establish a particular configuration of the various configurable components, such as, for example, an instruction to configure the electromagnetic coupler to provide a coupled signal in a certain frequency band at the measurement node 132, coupled from the forward traveling signal at the input port 102. Such an instruction may be processed by the control circuit 120 to establish all the selectable and switchable states of the configurable components into a state that complies with the instruction.

Alternately or in addition, the control circuit 120 may be instructed or configured to determine what frequency bands are present and to automatically configure a certain operating mode based upon the detected frequency bands without additional instruction. Further to this example, the control circuit 120 may be provided with a feedback signal from a measurement component coupled to the measurement node 132, and the control circuit 120 may adjust termination loads, filters, selection switches, etc., in various combinations to determine which combinations produce an expected result or a best result, or to detect which frequency band or bands are present in a signal and select a certain configuration based upon the detected band or bands.

FIGS. 7A to 7G illustrate various examples of combinations for the filtering subsystem 130 in terms of input arrangement, output arrangement, filters, loads, and termination points. It will be apparent from the foregoing discussion that many combinations of switches, buses, loads, termination points, or measurement nodes may be functional and are contemplated by embodiments of the filtering subsystem 130. Any alternative combination of one or more of the above arrangements, or sub-arrangements, of those described with respect to any of FIGS. 7A to 7G can be implemented in accord with aspects disclosed herein.

Figure 8A:
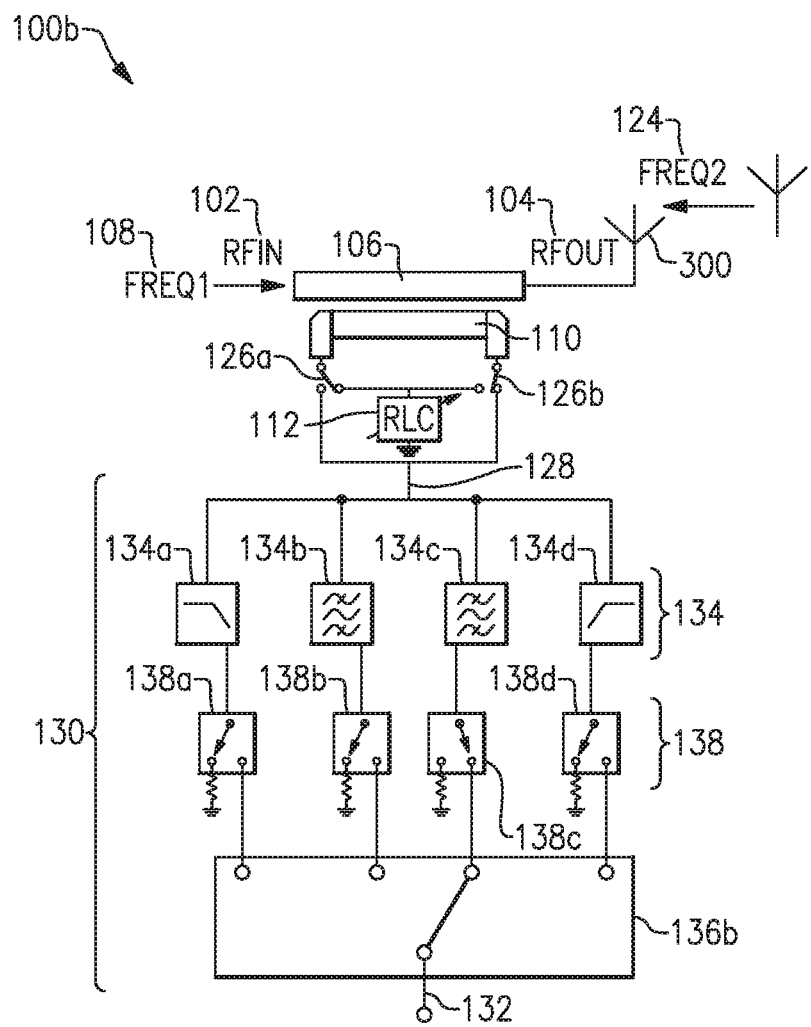
FIG. 8A is a block diagram of one embodiment of an electromagnetic coupler with multi-band filtering according to aspects of the present invention.

An example of a system including a coupler combination with a filtering subsystem is shown in FIG. 8A. The EM coupler 100b is shown configured for reverse operating mode, in a scenario similar to that shown in FIG. 2B, to monitor RF power from a transmitted signal 108 being reflected by an antenna 300 and entering the output port 104. It may be desirable to measure reflected RF power entering output port 104, for example, to monitor or determine a Voltage Standing Wave Ratio (VSWR) between a power amplifier 400 and the antenna 300. Note the mode selection switch 126a is positioned for reverse operating mode because the switch 126a is connecting the termination load 112 to the end of the coupled line section 110 nearest the input port 102. Additionally, the mode selection switch 126b is also positioned for reverse operating mode because the switch 126b is connecting the coupled port 128 to end of the coupled line section 110 nearest the output port 104, thus RF energy entering the output port 104 will be coupled to the coupled port 128. In the scenario shown in FIG. 8A, there is also a received signal 124 being received by the antenna 300 and entering the output port 104 in addition to the reflected transmitted signal 108.

The frequencies associated with the transmitted signal 108 include a frequency band freq1, and the frequencies associated with the received signal 124 include a frequency band freq2, that are of higher frequencies than band freq1, in this example. Accordingly, the EM coupler 100b is configured to accommodate these frequencies as components of a transmitted signal 108, a received signal 124, or a reflection of the transmitted signal 108. The filter 134a is a lowpass filter optimized for a frequency band below that of frequency band freq1, and the filter 134b is a bandpass filter optimized for a frequency band higher than that of filter 134a but still lower than frequency band freq1. The filter 134c is a bandpass filter optimized for the frequency band freq1, while the filter 134d is a highpass filter optimized for the frequency band freq2, for example. As discussed above, those skilled in the art, with benefit of this disclosure, will readily appreciate that the structure may be modified to accommodate more or fewer filters 134 and more, fewer, or different frequencies or frequency bands, and that the frequency bands for which the filters 134 are optimized may overlap in some embodiments. Any one or more of the filters 134 can be adjustable to allow the respective passed frequency band to be adjusted. Further, those skilled in the art will readily appreciate, given the benefit of this disclosure, that a wide variety of alternative configurations are possible and that the filters 134 can be any of (optionally adjustable) lowpass, bandpass, band-reject, or highpass filters, provided that they can be configured to pass a frequency band of interest and reject other frequencies.

Still with reference to FIG. 8A, the coupled signal component associated with freq1, which is a portion of the transmitted signal 108 reflected by the antenna 300, will pass through filter 134c and be provided at measurement node 132 by filter selection switch 136b, which is in a position to connect the output of the filter 134c to the measurement node 132. Note that the coupled signal component associated with freq2, which is a portion of the received signal 124, will not pass through the filter 134c but instead will pass through the filter 134d. The selectable load 138d is configured to absorb any signal component passing through the filter 134d, and thereby the coupled signal component associated with freq2 will not be present at the measurement node 132, nor will it be reflected or otherwise sent back toward the coupled port 128.

With regard to the specific embodiment of FIG. 8A, the filters 134b and 134c, which are bandpass filters, may be implemented as acoustic wave filters, and the filters 134a and 134d, which are a lowpass filter and a highpass filter, respectively, may be implemented as Integrated Passive Devices (IPD's). The selectable loads 138 and, optionally, the filter selection switch 136b, may be implemented on a silicon die.

Figure 8B:
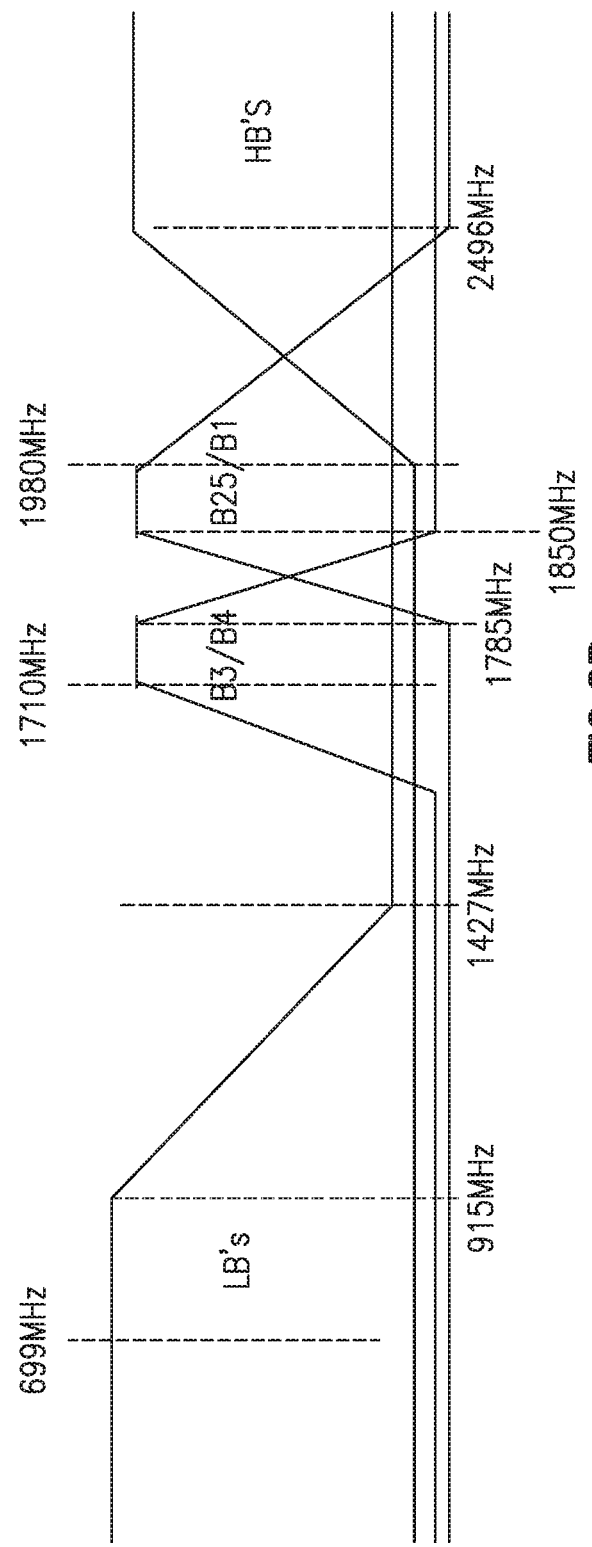
FIG. 8B is a frequency response chart corresponding to a specific implementation of the electromagnetic coupler of FIG. 8A.

An embodiment of the EM coupler 100b shown in FIG. 8A may be directed to a particular set of bands. In such an embodiment, the filters 134 may have lowpass, bandpass, and highpass characteristics as illustrated in FIG. 8B. In particular, the filter 134b may pass frequencies 1710 MHz to 1785 MHz and reject others, while the filter 134c may pass frequencies 1850 MHz to 1980 MHz and reject others. The filter 134a is a lowpass filter and may pass frequencies below 915 MHz and reject frequencies above 915 MHz. The filter 134d is a highpass filter and may pass frequencies above 2496 MHz and reject frequencies below 2496 MHz. The example frequency bands associated with the filters 134a, 134b, 134c, and 134d of FIG. 8A and as illustrated in FIG. 8B may be particularly desirable as boundaries between various cellular bands across international standards.

The entirety of structural components shown in FIG. 8A, except for the antennas, may be implemented as a single package or module. Further, the structural components of any embodiment of an EM coupler and/or a filtering subsystem as disclosed herein may likewise be implemented as a single package or module. As previously noted, all switching components, adjustable termination impedances 112, and selectable loads 138, may be controlled by a control circuit 120, which also may be implemented in a single package or module, along with or separate from an EM coupler and/or filtering subsystem.

Figure 9:
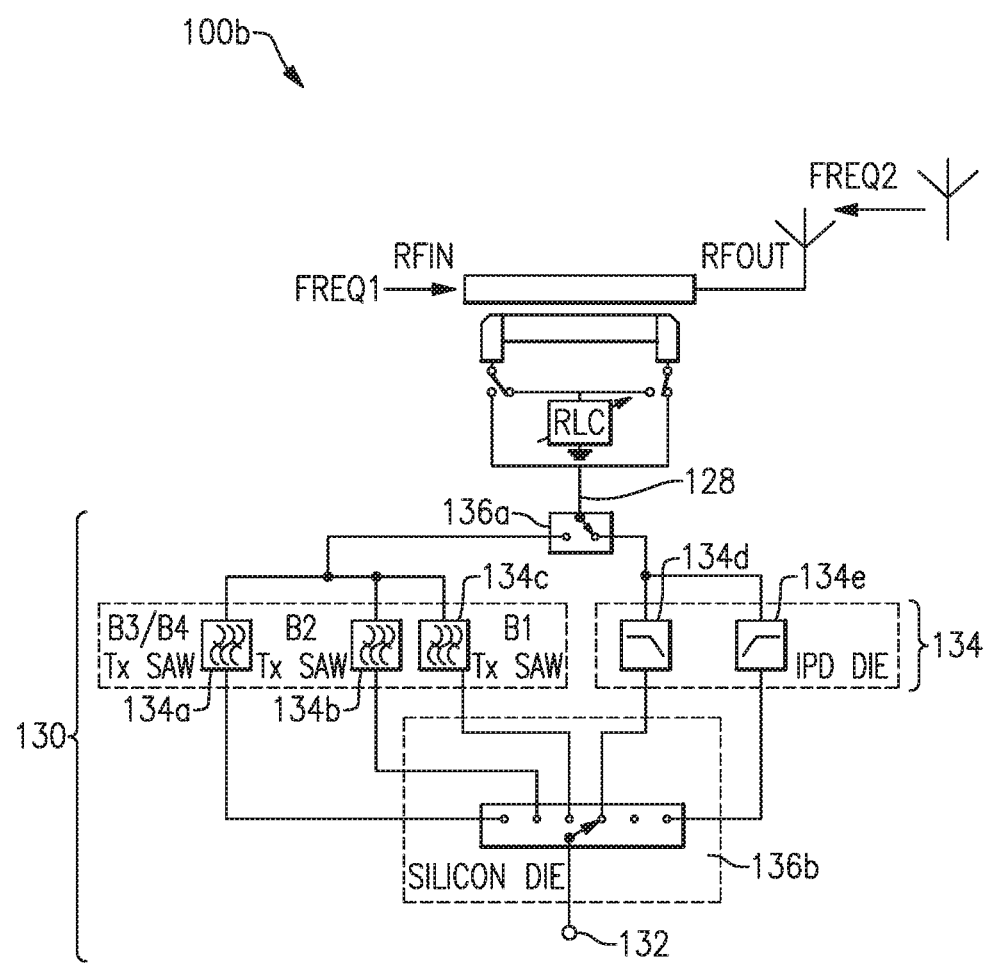
FIG. 9 is a block diagram of another embodiment of an electromagnetic coupler with multi-band filtering according to aspects of the present invention.

Another embodiment of a system including an EM coupler in combination with a filtering subsystem is shown in FIG. 9. In this embodiment the filtering subsystem 130 has a filter selection switch 136a on the input side as well as a filter selection switch 136b on the output side. The filter selection switch 136a selects one of two filter buses. The first bus is a common input bus for three filters 134a, 134b, 134c, all of which are bandpass SAW filters. The second filter bus is a common input bus for two filters 134d, 134e, each of which is implemented as IPD filters on a die. The filter 134d is a lowpass filter while the filter 134e is a highpass filter. Selectable loads 138 (not shown) may also be provided for one or more of the filters 134, as discussed above.

Figure 10:
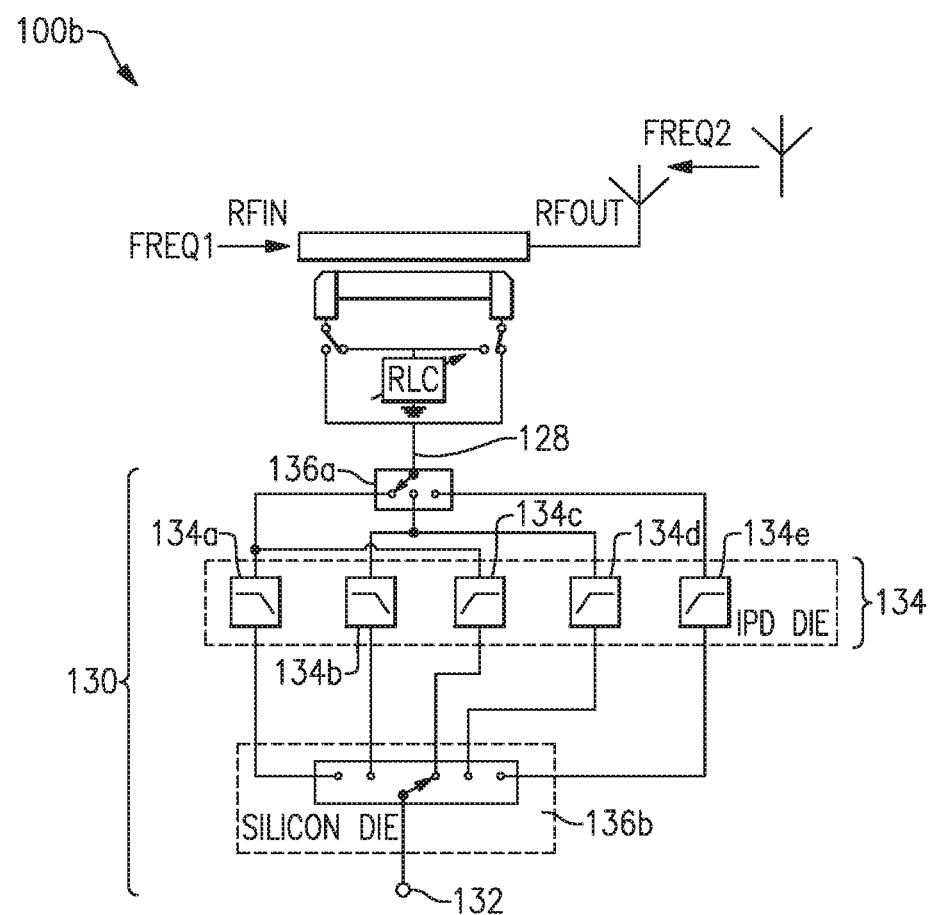
FIG. 10 is a block diagram of another embodiment of an electromagnetic coupler with multi-band filtering according to aspects of the present invention.

Another embodiment of a system including an EM coupler in combination with a filtering subsystem is shown in FIG. 10. In this embodiment the filtering subsystem 130 has a filter selection switch 136a on the input side as well as a filter selection switch 136b on the output side. The filter selection switch 136a selects one of three filter buses. The first bus is a common input bus for two filters 134a, 134c, one of which is a lowpass filter and the other of which a highpass filter. The second filter bus is a common input bus for two filters 134b, 134d, one of which is a lowpass filter and the other of which a highpass filter, each of which is optimized for different frequency bands than those of the first two filters 134a, 134c. The third filter bus connects to only one filter 134e, which is a highpass filter. Each of the filters 134 are implemented as IPD filters on a die in the example of FIG. 10, but they could be any combination of IPD, SAW, or other filter types. Selectable loads 138 (not shown) may also be provided for one or more of the filters 134, as discussed above.

In the example embodiment of FIG. 10, the pair of filters 134a, 134c may be a matched pair in that the frequencies passed by the lowpass filter 134a may be the frequencies rejected by the highpass filter 134c, and vice versa. Likewise, the filter pair 134b, 134d may also be a matched pair in that the frequencies passed by the lowpass filter 134b may be the frequencies rejected by the highpass filter 134d, and vice versa. In such fashion, the filter selection switch 136a effectively selects between at least two configurations, each of the two example configurations representing a different crossover frequency between an upper band and a lower band. For example, the lowpass filter 134a may be optimized to pass frequencies below 1810 MHz and reject frequencies above 1810 MHz, and the highpass filter 134c may be optimized to reject frequencies below 1810 MHz and pass frequencies above 1810 MHz. In such a scenario, the filter pair 134a, 134c may be said to have a crossover frequency of 1810 MHz. In similar fashion, the filter pair 134b, 134d may have a crossover frequency of 2140 MHz. With this type of arrangement, at least two of the settings of filter selection switch 136a are selections of a crossover frequency of the filtering subsystem 130, and in this example the selections being a crossover frequency of either 1810 MHz or 2140 MHz. As previously noted, any of the filters 134 may be adjustable, thus allowing a crossover frequency to be adjustable as well.

In the various embodiments shown, mode select switches 126 allow both the forward and reverse coupled paths of the EM coupler to share the filtering subsystem 130. In other embodiments, any coupled path may have a dedicated filtering subsystem in order to allow, for example, forward and reverse coupled measurements at the same time. Additionally, this approach can be readily extended to coupled paths associated with additional line sections coupled to transmission line 106, with additional filtering subsystems 130, or with additional switch arrangements to allow sharing of fewer filtering subsystems 130.

As described above, aspects and embodiments provide a highly configurable EM coupler with multi-band filtering which can provide numerous benefits over conventional systems in which coupled output signals may otherwise contain multiple frequencies or frequency bands. The EM coupler with multi-band filtering avoids the need for multiple individual couplers each accommodating a respective frequency band, and associated ports and circuitry, each of which would need to be optimized (e.g., in terms of insertion loss, coupling factor, and/or directivity) for a particular frequency or band of frequencies. This can also reduce or eliminate the need for filters in the main path. Thus, embodiments of the EM coupler can provide a reduction in size relative to conventional systems because the main coupler transmission line path can be used for monitoring multiple frequencies, as discussed above.

The various switches described above for, e.g., mode selection, input/output selection, filter selection, filter loading, isolation, and adjustable impedance, may be implemented by field effect transistors. Alternatively, or additionally, one or more switches may be implemented by MEMS switches, fuse elements (e.g., fuses or antifuses), or any other suitable switch element.

The filtering subsystem 130 has generally been described and shown as being directly connected between a coupled output port of a selectively bi-directional EM coupler and one or more measurement nodes, but various embodiments could have the filtering subsystem 130 connected in alternate arrangements. For example, the filtering subsystem 130 can be connected more closely to the coupled line section 110, before any mode select switches, and may filter out, or reject, the undesired portion of a coupled signal prior to the signal reaching any mode select switches or termination loads. Various connectivity arrangements of the various embodiments of the filtering subsystem 130 can be implemented in accord with features and aspects disclosed herein, with a coupled signal entering the filtering subsystem 130 at one connection and a filtered signal emerging from another connection. In all such cases, a point at which the coupled signal enters may be a coupled port and a point at which the filtered signal emerges may be a measurement node.

It should be noted that lowpass, bandpass, band-reject, and highpass filters, such as any of the filters 134 described, are not ideal filters and do not achieve a complete rejection of the frequencies they are designed to block, nor a complete passage of the frequencies they are designed to pass. In the various descriptions of embodiments, any absolute terminology, such as that "none" of a signal will pass or be present, or that a signal component is "blocked" or "passed," will be understood by those of skill in the art to mean that a substantial portion will be blocked or will be passed, or the resulting signal will be substantially free of the component or substantially consist of only the component. For examples, filters in accord with embodiments herein might achieve only a 3 dB difference between "passing" and "blocking" the frequencies of interest, or may achieve a 30 dB difference or more, or any effective difference in keeping with various filter designs and the operational parameters or needs of the application at hand.

Figure 11A:
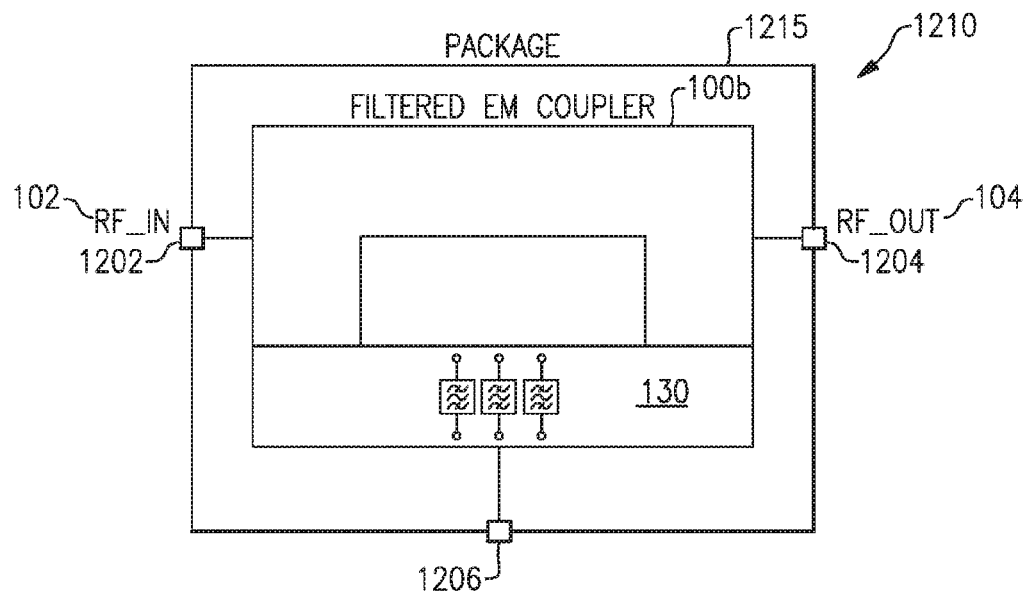
FIG. 11A is a block diagram of one example of a module including an electromagnetic coupler with multi-band filtering according to aspects of the present invention.
Figure 11B:
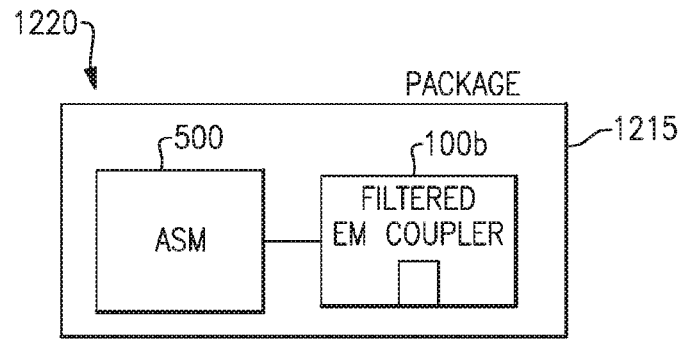
FIG. 11B is a block diagram of one example of another module including an electromagnetic coupler with multi-band filtering according to aspects of the present invention.
Figure 11C:
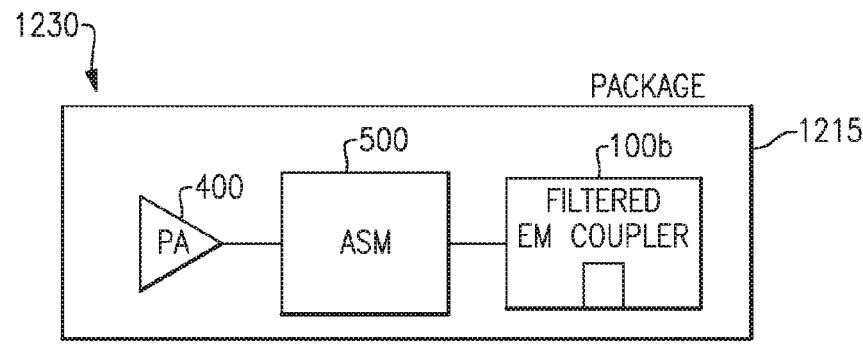
FIG. 11C is a block diagram of one example of another module including an electromagnetic coupler with multi-band filtering according to aspects of the present invention.

Embodiments of the EM couplers 100b described herein can be implemented in a variety of different modules including, for example, a stand-alone EM coupler, an antenna switch module, a module combining an EM coupler and an antenna switch module, an impedance matching module, an antenna tuning module, or the like. FIGS. 11A to 11C illustrate examples of modules that can include any of the band-filtering EM couplers discussed herein. These example modules can include any combination of features associated with EM couplers, termination impedance circuits, filtering subsystems, switch networks and/or switch circuits, or the like.

FIG. 11A is a block diagram of one example of a packaged module 1210 that includes an embodiment of the filtered EM coupler 100b in accordance with any of the principles and advantages discussed with reference to any of the EM couplers 100b of FIGS. 6A-10. The packaged module 1210 includes a package 1215 that encases the EM coupler 100 with filtering subsystem 130. The packaged module 1210 can include contacts, such as pins, sockets, ball, lands, etc., corresponding to each port of the EM coupler 100. In some embodiments, the packaged module 1210 can include a contact 1202 corresponding to the RF power input port 102, a contact 1204 corresponding to the RF power output port 104, and contact 1206 corresponding to the measurement node. According to another embodiment, the packaged module 1210 can include multiple contacts for filtered coupled output signals corresponding to either forward or reverse operating mode and corresponding to various filter outputs, depending on the state of switches in the packaged module 1210. Termination impedance circuits and/or switches in accordance with any of the principles and advantages discussed herein can be included within the package 1215 of any of the example modules illustrated in FIGS. 11A-11C.

FIG. 11B is a block diagram of a packaged module 1220 that includes an EM coupler 100 and an antenna switch module 500. In the example of FIG. 11B, the package 1215 encases both the EM coupler 100 and the antenna switch module 500.

FIG. 11C is a block diagram of a packaged module 1230 that includes an embodiment of the band-filtering EM coupler 100, an antenna switch module 500, and a power amplifier 400. The packaged module 1230 includes these elements within a common package 1215.

Embodiments of the band-filtering EM couplers disclosed herein, optionally packaged into one of the modules 1210, 1220, or 1230 discussed above, may be advantageously used in a variety of electronic devices, such as wireless devices (e.g., cell phones, tablets, etc.).

Figure 12:
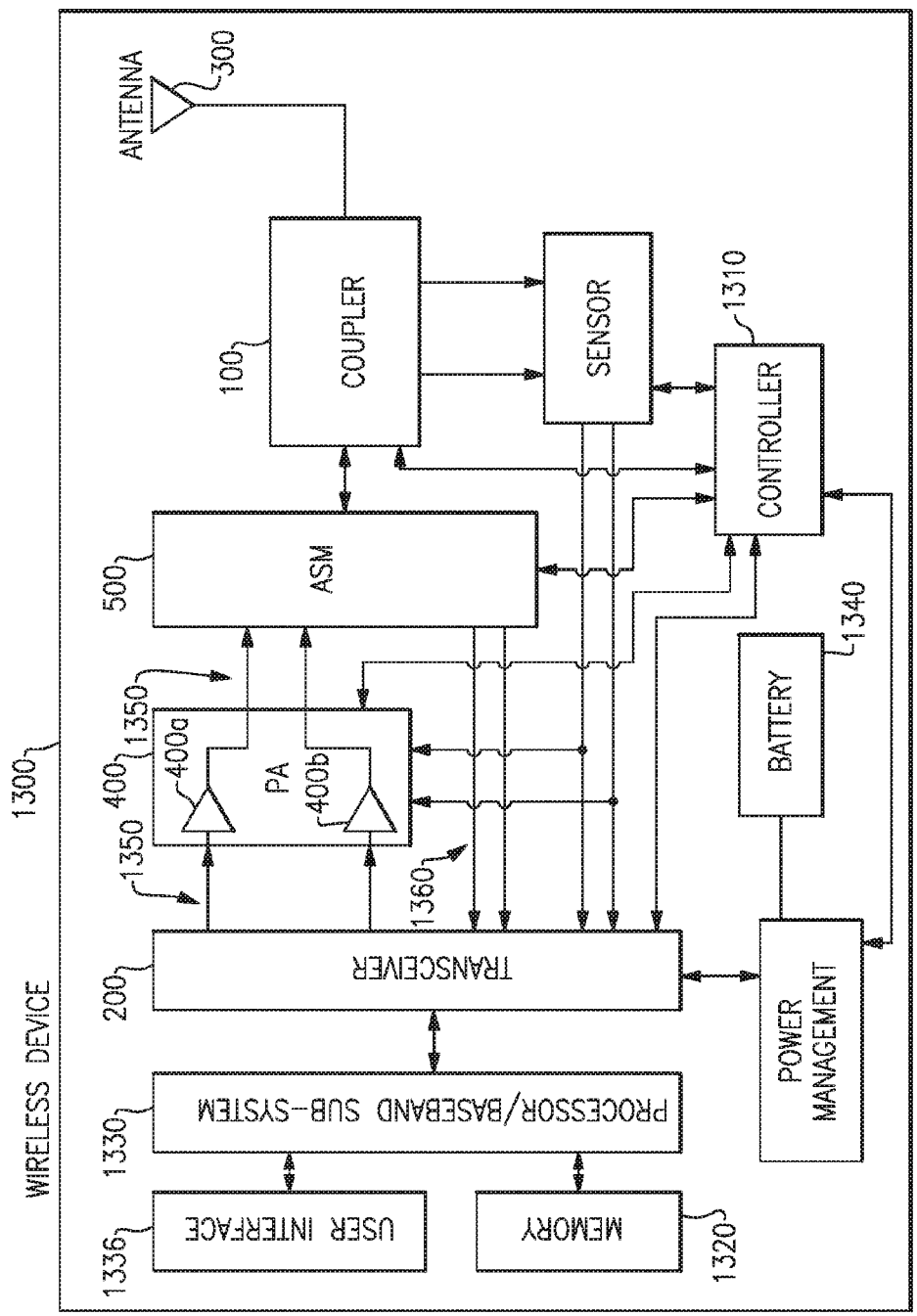
FIG. 12 is a block diagram of a wireless device in which embodiments of the electromagnetic couplers according to aspects of the present invention may be used.
Figure 13A:
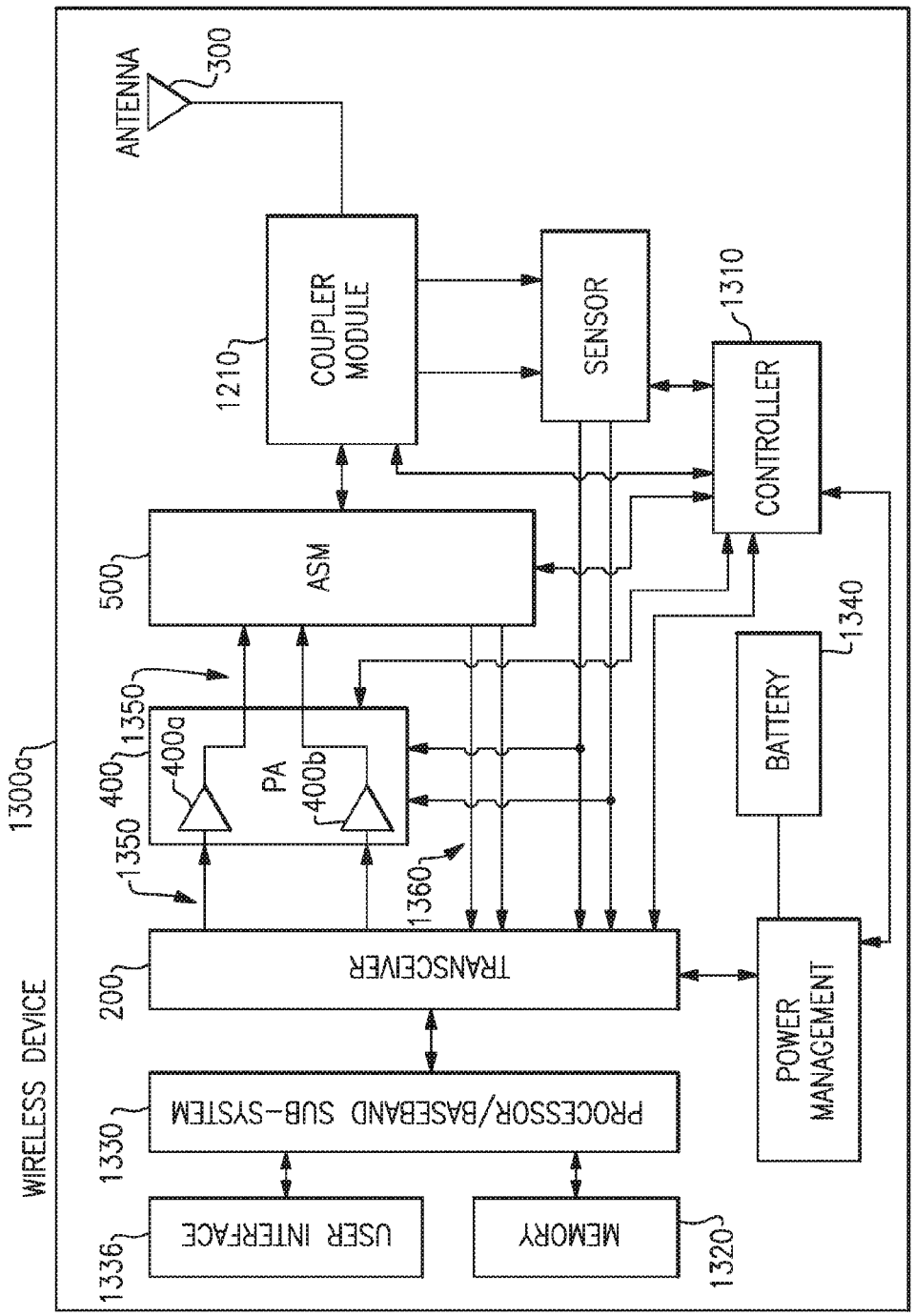
FIG. 13A is a block diagram of one example of a wireless device including the module of FIG. 11A.
Figure 13B:
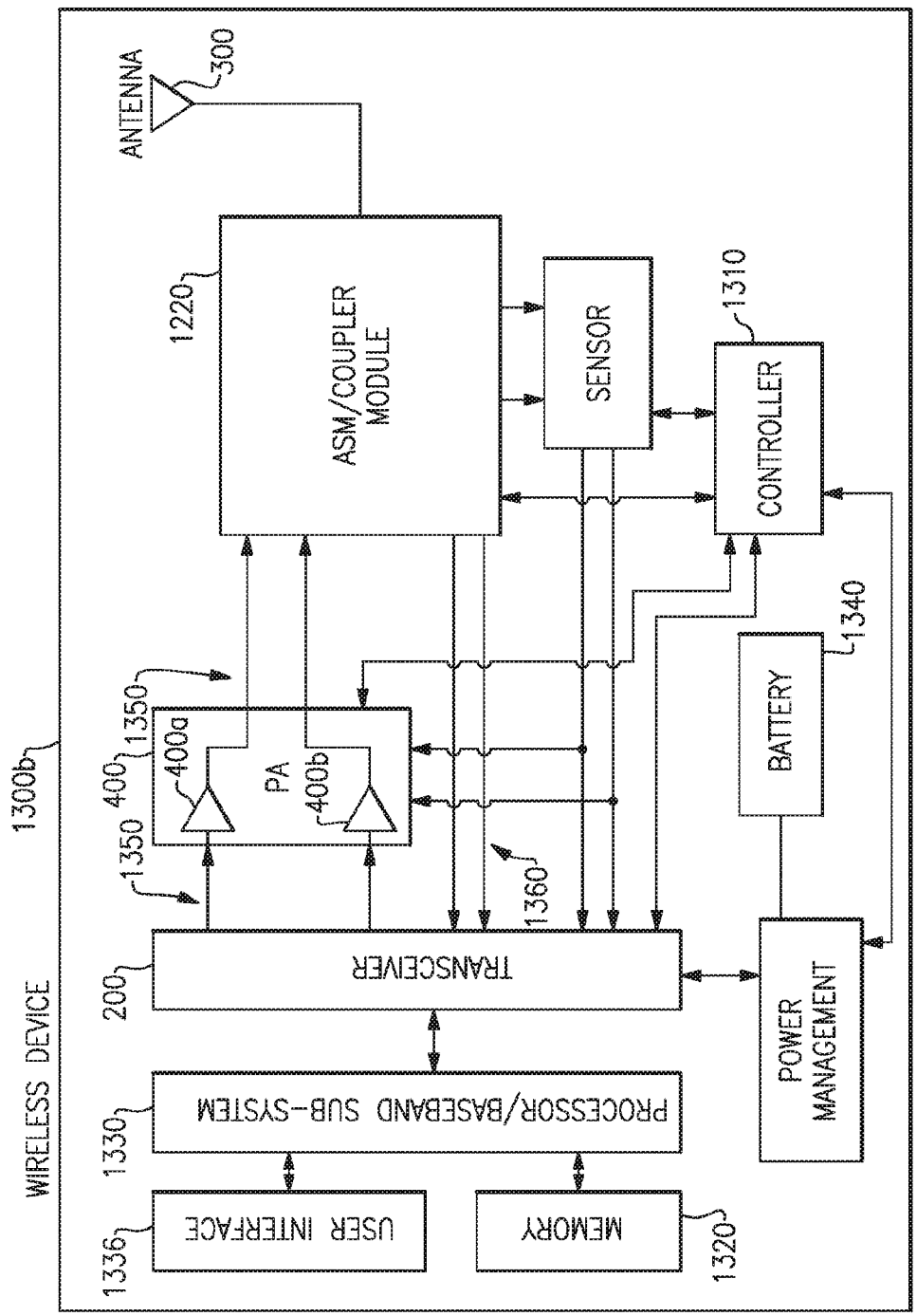
FIG. 13B is a block diagram of one example of a wireless device including the module of FIG. 11B.
Figure 13C:
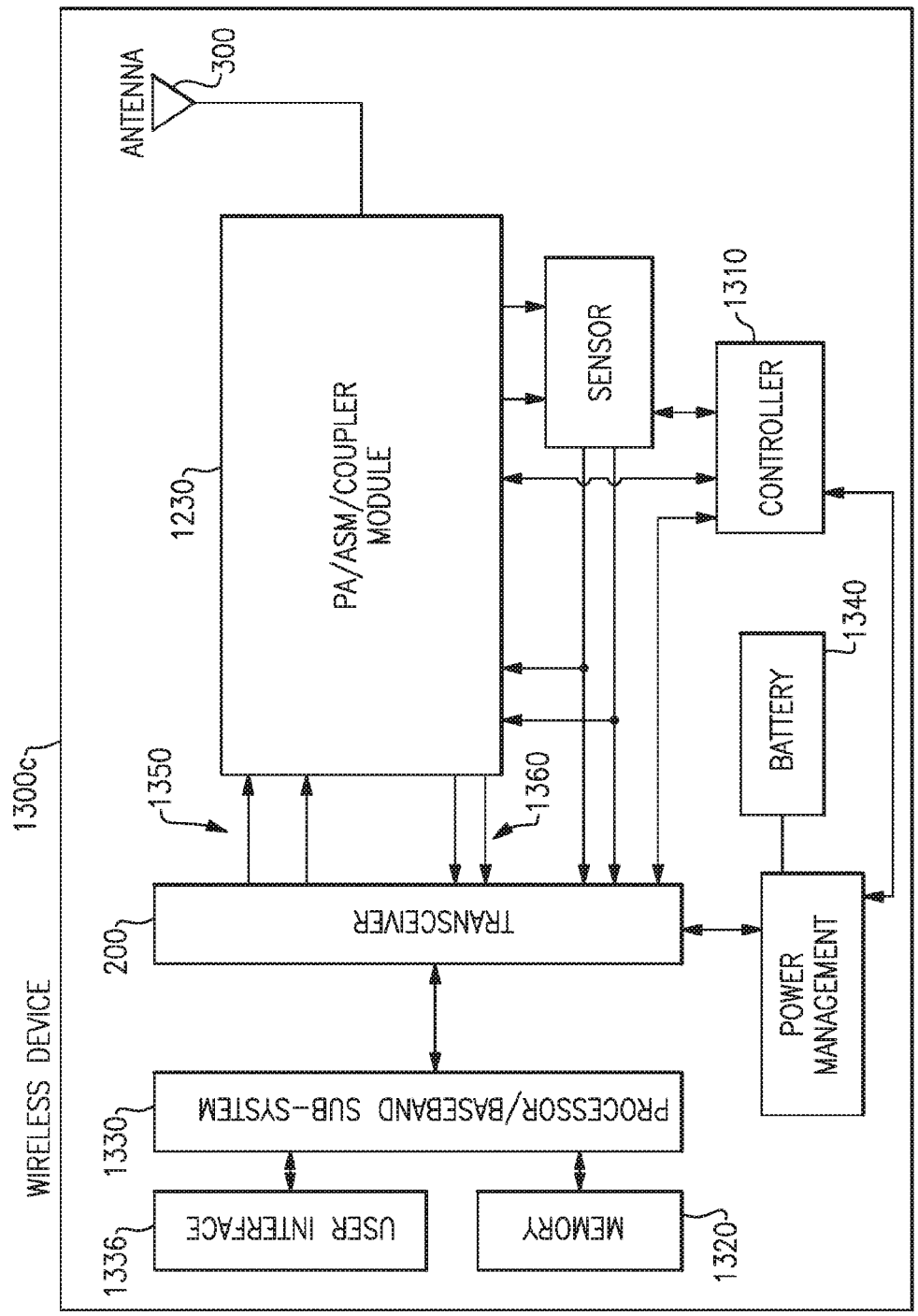
FIG. 13C is a block diagram of one example of a wireless device including the module of FIG. 11C.

FIG. 12 is a block diagram illustrating an example of a wireless device 1300 that can include one or more EM couplers having one or more features discussed herein. For instance, the example wireless device 1300 can include an EM coupler in accordance with any of the principles and advantages discussed with reference to any of the EM couplers of FIGS. 2-10. The example wireless device 1300 can be a mobile phone, such as a smart phone. The wireless device 1300 can include elements that are not illustrated in FIG. 12 and/or a subcombination of the illustrated elements. Further, as discussed above, the wireless device 1300 can include any of the modules 1210, 1220 or 1230. For example, FIG. 13A illustrates an example of the wireless device 1300a in which the EM coupler 100 is replaced with the module 1210. FIG. 13B illustrates another example of the wireless device 1300b in which the EM coupler 100 and ASM 500 are replaced with the module 1220. FIG. 13C illustrates an example of the wireless device 1300c in which the EM coupler 100, ASM 500, and power amplifiers 400a, 400b are replaced with the module 1230.

The wireless device 1300 depicted in FIG. 12, or any of the alternative wireless devices 1300a-c, can represent a multi-band and/or multi-mode device such as a multi-band/multi-mode mobile phone. By way of example, the wireless device 1300 can communicate in accordance with Long Term Evolution (LTE). In this example, the wireless device 1300 can be configured to operate at one or more frequency bands defined by an LTE standard. The wireless device 1300 can alternatively or additionally be configured to communicate in accordance with one or more other communication standards, including but not limited to one or more of a Wi-Fi standard, a Bluetooth standard, a 3G standard, a 4G standard or an Advanced LTE standard.

As illustrated in FIG. 12, the wireless device 1300 can include a transceiver 200, an antenna switch module 500, an EM coupler 100, an antenna 300, power amplifiers 400, a control component 1310, a computer readable storage medium 1320, at least one processor 1330, a user interface 1336, and a battery 1340.

As discussed above with reference to FIG. 1, the transceiver 200 can generate RF signals for transmission via the antenna 300. Furthermore, the transceiver 200 can receive incoming RF signals from the antenna 300. It will be understood that various functionalities associated with transmitting and receiving of RF signals can be achieved by one or more components that are collectively represented in FIG. 12 as the transceiver 1300. For example, a single component can be configured to provide both transmitting and receiving functionalities. In another example, transmitting and receiving functionalities can be provided by separate components.

In FIG. 12, one or more output signals from the transceiver 200 are depicted as being provided to the antenna 300 via one or more transmission paths 1350. In the example shown, different transmission paths 1350 can represent output paths associated with different frequency bands (e.g., a high band and a low band) and/or different power outputs. One or more of the transmission paths 1350 can be associated with different transmission modes. One or more of the illustrated transmission paths 1350 can be active while one or more of the other transmission paths 1350 are non-active. Other transmission paths 1350 can be associated with different power modes (e.g., high power mode and low power mode) and/or paths associated with different transmit frequency bands. The transmission paths 1350 can include one or more power amplifiers 400 to aid in boosting an RF signal having a relatively low power to a higher power suitable for transmission. As illustrated, the power amplifiers 400a and 400b can be included in the power amplifier module 400 discussed above with reference to FIG. 1. The wireless device 1300 can be adapted to include any suitable number of transmission paths 1350.

In FIG. 12, one or more signals from the antenna 300 are depicted as being provided to the transceiver 200 via one or more receive paths 1360. In the example shown, different receive paths 1360 can represent paths associated with different signaling modes and/or different receive frequency bands. The wireless device 1300 can be adapted to include any suitable number of receive paths 1360.

To facilitate switching between receive and/or transmit paths, the antenna switch module 500 can be included and can be used to selectively electrically connect the antenna 300 to a selected transmit or receive path. Thus, the antenna switch module 500 can provide a number of switching functionalities associated with an operation of the wireless device 1300. The antenna switch module 500 can include a multi throw switch configured to provide functionalities associated with, for example, switching between different bands, switching between different modes, switching between transmission and receiving modes, or any combination thereof.

The EM coupler 100 can be disposed between the antenna switch module 500 and the antenna 300. The EM coupler 100 can provide an indication of forward power provided to the antenna 300 and/or an indication of reverse power reflected from the antenna 300. The indications of forward and reverse power can be used, for example, to compute a reflected power ratio, such as a return loss, a reflection coefficient, or a voltage standing wave ratio (VSWR). The EM coupler 100 illustrated in FIG. 12 can implement any of the principles and advantages of the EM couplers discussed herein.

FIG. 12 illustrates that in certain embodiments, a control component 1310 can be provided for controlling various control functionalities associated with operations of the antenna switch module 500 and/or other operating component(s). For example, the control component 1310 can aid in providing control signals to the antenna switch module 500 so as to select a particular transmit or receive path. As another example, the control component 1310 can provide control signals to configure the EM coupler 100 and/or an associated termination impedance circuit and/or a filtering subsystem and/or an associated switch network in accordance with any of the principles and advantages discussed herein.

In certain embodiments, the at least one processor 1330 can be configured to facilitate implementation of various processes on the wireless device 1300. The at least one processor 1330 can be, for example, a general purpose processor or a special purpose processor. In certain implementations, the wireless device 1300 can include a non-transitory computer readable medium 1320, such as a memory, which can store computer program instructions that may be provided to and executed by the at least one processor 1330.

The battery 1340 can be any suitable battery for use in the wireless device 1300, including, for example, a lithium-ion battery.

Some of the embodiments described above have provided examples in connection with power amplifiers and/or mobile devices. However, the principles and advantages of the embodiments can be used for any other systems or apparatus, such as any uplink cellular device, that could benefit from any of the circuits described herein. Any of the principles and advantages discussed herein can be implemented in an electronic system with a need for detecting and/or monitoring a power level associated with an RF signal, such as forward RF power and/or a reverse RF power. Any of the switch networks and/or switch circuit discussed herein can alternatively or additionally be implemented by any other suitable logically equivalent and/or functionally equivalent switch networks. The teachings herein are applicable to a variety of power amplifier systems including systems with multiple power amplifiers, including, for example, multi-band and/or multi-mode power amplifier systems. The power amplifier transistors discussed herein can be, for example, gallium arsenide (GaAs), complementary metal oxide semiconductor (CMOS), silicon on insulator (SOI), or silicon germanium (SiGe) transistors. Moreover, power amplifiers discussed herein can be implemented by FETs and/or bipolar transistors, such as heterojunction bipolar transistors.

Aspects of this disclosure can be implemented in various electronic devices. Examples of the electronic devices can include, but are not limited to, consumer electronic products, parts of the consumer electronic products, electronic test equipment, cellular communications infrastructure such as a base station, etc. Examples of the electronic devices can include, but are not limited to, a mobile phone such as a smart phone, a telephone, a television, a computer monitor, a computer, a modem, a hand held computer, a laptop computer, a tablet computer, an electronic book reader, a wearable computer such as a smart watch, a personal digital assistant (PDA), a microwave, a refrigerator, an automobile, a stereo system, a DVD player, a CD player, a digital music player such as an MP3 player, a radio, a camcorder, a camera, a digital camera, a portable memory chip, a health care monitoring device, a vehicular electronics system such as an automotive electronics system or an avionics electronic system, a washer, a dryer, a washer/dryer, a peripheral device, a wrist watch, a clock, etc. Further, the electronic devices can include unfinished products.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A filtered electromagnetic coupler comprising:
   a main transmission line extending between an input port and an output port;
   a coupled line section extending between a coupled port and an isolation port and configured to couple signal power from the main transmission line to provide a plurality of coupled signals at the coupled port, each of the plurality of coupled signals associated with a different frequency band;
   a filter subsystem including a plurality of filters and being connected to the coupled port and configured to receive and filter the plurality of coupled signals to provide at least one filtered output signal at a measurement node, the plurality of filters including a first filter configured to pass a first coupled signal of the plurality of coupled signals associated with a first frequency band and to reject a second coupled signal of the plurality of coupled signals associated with a second frequency band, and a second filter configured to pass the second coupled signal and reject the first coupled signal; and
   a load selectively coupled to at least one of the plurality of filters.

2. The filtered electromagnetic coupler of claim 1 further comprising a mode switch operable to selectively provide the plurality of coupled signals as a forward signal representative of a signal traveling from the input port to the output port, or to selectively provide the plurality of coupled signals as a reverse signal representative of a signal traveling from the output port to the input port.

3. The filtered electromagnetic coupler of claim 1 wherein at least one of the plurality of filters is selectively connected between the coupled port and the measurement node.

4. The filtered electromagnetic coupler of claim 1 wherein each of the plurality of filters is one of a lowpass filter, a bandpass filter, a band-reject filter, and a highpass filter.

5. The filtered electromagnetic coupler of claim 1 wherein at least one of the plurality of filters is an acoustic wave filter.

6. The filtered electromagnetic coupler of claim 1 wherein at least one of the plurality of filters is an integrated passive device filter.

7. The filtered electromagnetic coupler of claim 1 wherein at least one of the plurality of filters has an adjustable filter characteristic.

8. The filtered electromagnetic coupler of claim 1 further comprising an adjustable termination impedance circuit coupled to the isolation port.

9. The filtered electromagnetic coupler of claim 1 wherein the load is an adjustable load.

10. A method of processing an electromagnetic signal, the method comprising:
    receiving a plurality of coupled signals from a coupled port of an electromagnetic coupler, each coupled signal of the plurality of coupled signals associated with a different respective frequency band;
    selectively filtering the plurality of coupled signals by a first filter of a plurality of filters, the first filter configured to pass a first coupled signal of the plurality of coupled signals and to reject a second coupled signal of the plurality of coupled signals; and
    providing the first coupled signal to a measurement node.

11. The method of claim 10 further comprising detecting the first coupled signal and adjusting an adjustable termination impedance connected to an isolation port of the electromagnetic coupler based at least in part upon the first coupled signal.

12. The method of claim 10 further comprising detecting a frequency component of the first coupled signal and adjusting the at least one of the plurality of filters based at least in part upon the frequency component.

13. The method of claim 10 further comprising detecting a frequency component of the first coupled signal and selecting the at least one of the plurality of filters based at least in part upon the frequency component.

14. The method of claim 10 further comprising measuring a signal strength of the first coupled signal.

15. The method of claim 14 further comprising adjusting a power amplifier based at least in part upon the signal strength.

16. The method of claim 10 further comprising selectively coupling a second filter of the plurality of filters to a load.

17. A filtered electromagnetic coupler comprising:
    a main transmission line extending between an input port and an output port;
    a coupled line section extending between a coupled port and an isolation port and configured to couple signal power from the main transmission line to provide one or more coupled signals at the coupled port;

a measurement node; and a plurality of filters selectively connected between the coupled port and the measurement node, the plurality of filters including a first filter having a first filter characteristic that passes a first coupled signal having components of a first frequency band and rejects a second coupled signal having components of a second frequency band, and a second filter having a second filter characteristic that passes the second coupled signal and rejects the first coupled signal, to provide at least one filtered output signal at the measurement node.

18. The filtered electromagnetic coupler of claim 17 wherein the measurement node includes a plurality of measurement node nodes and is configured such that the selective connectivity occurs by coupling a measurement device to one of the measurement node nodes.

19. The filtered electromagnetic coupler of claim 17 wherein each of the plurality of filters is one of a lowpass filter, a bandpass filter, a band-reject filter, and a highpass filter, and at least one of the plurality of filters is one of an acoustic wave filter and an integrated passive device filter.

20. The filtered electromagnetic coupler of claim 17 wherein at least one of the plurality of filters has an adjustable filter characteristic.

21. The filtered electromagnetic coupler of claim 17 further comprising a mode switch operable to selectively provide the one or more coupled signals as a forward signal representative of a signal traveling from the input port to the output port, or to selectively provide the one or more coupled signals as a reverse signal representative of a signal traveling from the output port to the input port.

22. The filtered electromagnetic coupler of claim 17 further comprising an adjustable termination impedance circuit coupled to the isolation port.

23. The filtered electromagnetic coupler of claim 17 further comprising a load selectively coupled to at least one of the plurality of filters.

* * * * *